United States Patent
Murata

(10) Patent No.: US 10,282,067 B2
(45) Date of Patent: May 7, 2019

(54) METHOD AND APPARATUS OF CONTROLLING AN INTERFACE BASED ON TOUCH OPERATIONS

(71) Applicant: Sony Corporation, Tokyo (JP)

(72) Inventor: Yu Murata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1217 days.

(21) Appl. No.: 13/909,811

(22) Filed: Jun. 4, 2013

(65) Prior Publication Data

US 2014/0359528 A1    Dec. 4, 2014

(51) Int. Cl.
    *G06F 3/0484*      (2013.01)
    *G06F 3/0481*      (2013.01)
    *G06F 3/0485*      (2013.01)
    *G06F 3/0488*      (2013.01)

(52) U.S. Cl.
    CPC ........ *G06F 3/04842* (2013.01); *G06F 3/0485* (2013.01); *G06F 3/0488* (2013.01); *G06F 3/04812* (2013.01); *G06F 3/04847* (2013.01); *G06F 2203/04808* (2013.01)

(58) Field of Classification Search
    CPC ......... G06F 63/044; G06F 3/046; G06F 3/048
    USPC ................................. 345/173–179
    See application file for complete search history.

(56) References Cited

U.S. PATENT DOCUMENTS

| | | | |
|---|---|---|---|
| 2006/0132457 A1 | 6/2006 | Rimas-Ribikauskas et al. | |
| 2007/0146335 A1* | 6/2007 | Hsieh et al. | 345/173 |
| 2009/0125848 A1* | 5/2009 | Keohane et al. | 715/863 |
| 2009/0228792 A1* | 9/2009 | van Os et al. | 715/702 |
| 2009/0228842 A1* | 9/2009 | Westerman et al. | 715/863 |
| 2010/0060605 A1 | 3/2010 | Rimas-Ribikauskas et al. | |
| 2010/0231529 A1* | 9/2010 | Tikka | 345/173 |
| 2011/0258537 A1* | 10/2011 | Rives et al. | 715/255 |
| 2012/0044173 A1 | 2/2012 | Homma et al. | |

(Continued)

FOREIGN PATENT DOCUMENTS

| | | |
|---|---|---|
| EP | 1 674 977 A2 | 6/2006 |
| EP | 2 098 947 A2 | 9/2009 |
| EP | 2 420 925 A2 | 2/2012 |

OTHER PUBLICATIONS

Extended European Search Report dated Oct. 17, 2014 in Patent Application No. 13182471.6.

(Continued)

*Primary Examiner* — Kent W Chang
*Assistant Examiner* — Sujit Shah
(74) *Attorney, Agent, or Firm* — Xsensus LLP

(57) ABSTRACT

An apparatus includes a touch panel display and circuitry for controlling the touch panel display such that an initial selection range of at least one of one or more character strings and one or more images is displayed. The circuitry determines, based on a predetermined condition of an input operation, a first mode and a second mode of altering the initial selection range. The circuitry alters the initial selection range by controlling the touch panel display such that, in response to a detection of the input operation and based on the determined mode, a starting point and/or an end point of the initial selection range are moved at a predetermined speed. The circuitry respectively controls the touch panel display under the first mode and the second mode such that the predetermined speed is different than, or the same as, a speed that the instruction object moves on the operation surface.

20 Claims, 16 Drawing Sheets

(56) References Cited

U.S. PATENT DOCUMENTS

2012/0242582 A1* 9/2012 Choi et al. .................... 345/169
2012/0274591 A1   11/2012 Rimas-Ribikauskas et al.
2012/0311507 A1* 12/2012 Murrett et al. ............... 715/863
2013/0070145 A1*  3/2013 Matsuyama ............. 348/333.12
2013/0113718 A1*  5/2013 Van Eerd et al. ............ 345/173
2013/0212463 A1*  8/2013 Pachikov et al. ............. 715/234

OTHER PUBLICATIONS

Office Action dated May 4, 2018 in European Application No. 13182471.6.

* cited by examiner

METHOD AND APPARATUS OF CONTROLLING AN INTERFACE BASED ON TOUCH OPERATIONS

BACKGROUND

Technical Field

The present disclosure relates to a method and apparatus for controlling a displayed interface. In particular, the present disclosure relates to a method and apparatus for controlling a displayed interface based on aspects of a touch operation performed on a touch panel.

Description of Related Art

On recent mobile devices, data displayed on a touch panel display screen may be selected by performing an input operation on an operation surface of the touch panel. For example, a character displayed on the touch panel may be selected by touching the operation surface of the touch panel at a position corresponding to the displayed character string. Moreover, a selection range of one or more character strings may be adjusted on the touch panel by moving an instruction object, such as a user's finger, on the operation surface of the touch panel by maintaining contact with the operation surface.

However, due to relative size differences between objects typically used as instruction objects (i.e. fingers) and data (e.g., text) displayed on mobile device touch panel screens, there exists a problem in that it is difficult to precisely select data displayed on a touch panel and/or adjust a selection range of data displayed on the touch panel using touch operations. For example, it is especially difficult to select a character string range in one character increments. In order to address the difficulties in performing data selection on mobile device touch panels, and in particular selection of a range of a character string, a portion of a display may be enlarged when the touch operation is performed, or features of displayed items (e.g., cursors) indicating a starting and/or endpoint of a character string may be adjusted (e.g. enlarged). However, instruction objects such as user's fingers typically still hide character strings during range selection, even when a portion of a display is enlarged during selection, thereby precluding confirmation that selection of a character string was performed accurately. Moreover, it is also difficult when a portion of a display is enlarged during range selection/alteration for a user to change a selection range in large increments and/or at high speeds. Moreover, in the method in which aspects of displayed items indicating a starting and/or endpoint of a character string (e.g. "knobs" included on a displayed cursor) are adjusted, it still becomes difficult to move enlarged portions of cursors over a small range, thereby making fine adjustments of a selection range of characters difficult. Further, previous methods do not provide for performing both fine and coarse adjustments of a character string selection range using the same gesture.

SUMMARY

In one embodiment, an apparatus includes a touch panel display that displays an interface including at least one of one or more character strings and one or more images, the touch panel display including one or more sensors for detecting an input operation by one or more instruction objects on the touch panel display. The apparatus may include circuitry configured to control the touch panel display such that an initial selection range of the at least one of the one or more character strings and the one or more images is displayed. The circuitry may determine an initial coordinate corresponding to a position on an operation surface of the touch panel display at which the input operation is initially performed. The circuitry may determine a speed at which the instruction object moves on the operation surface during the input operation. The circuitry may selectively determine, based on a predetermined condition of the input operation, a first mode and a second mode of altering the displayed initial selection range. The initial selection range may include a starting point and an end point that are displayed on the touch panel display. The circuitry may alter the initial selection range by controlling the touch panel display such that, in response to the detection of the input operation and based on the selectively determined mode, at least one of the displayed starting point and the displayed end point are moved at a predetermined speed from their initial positions. When the circuitry determines the initial selection range is altered in accordance with the first mode, the circuitry may control the touch panel display such that the predetermined speed is different than the detected speed at which the instruction object moves on the operation surface. When the circuitry determines the initial selection range is altered in accordance with the second mode, the circuitry may control the touch panel display such that the predetermined speed is substantially the same as the detected speed at which the instruction object moves on the operation surface.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
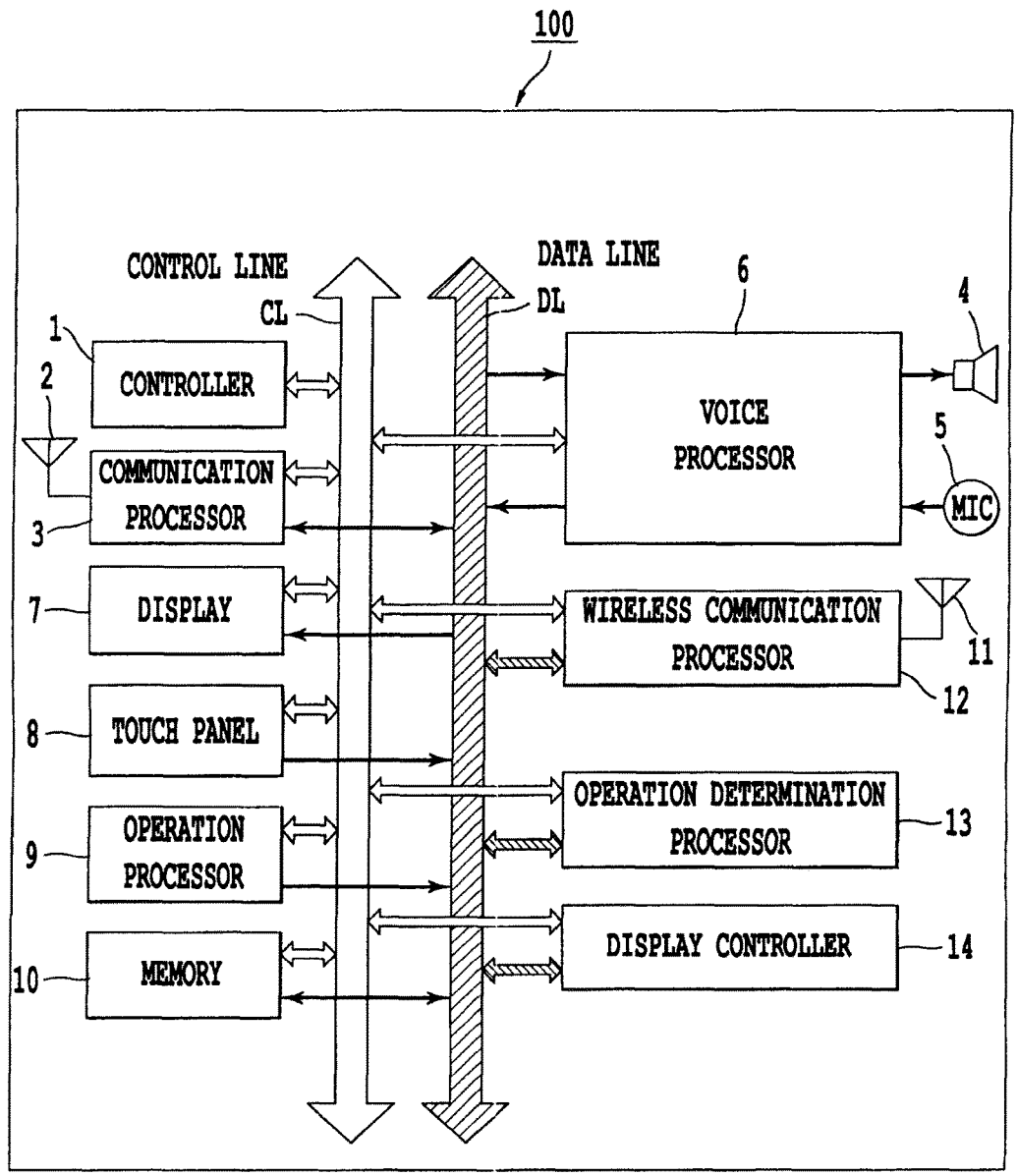
FIG. 1 illustrates an exemplary block diagram of a mobile device according to one aspect of the present disclosure.

Referring now to the drawings, wherein like reference numerals designate identical or corresponding parts throughout the several views.

FIG. 1 illustrates a block diagram for an exemplary mobile device 100.

The exemplary mobile device 100 of FIG. 1 includes a controller 1, a communication processor 3 connected to an antenna 2, a speaker 4, a microphone 5, and a voice processor 6.

The controller 1 may include one or more Central Processing Units (CPUs), and may control each element in the mobile device 100 to perform features related to communication control, audio signal processing, control for the audio signal processing, image processing and control, and other kinds signal processing. The controller 1 may perform these features by executing instructions stored in a memory 10 or a non-transitory computer readable medium having instructions stored therein.

Moreover, the controller 1 may determine a moving distance and/or speed of a cursor (or other indication of character string selection range boundaries) included in an interface displayed on display 7. The cursor(s) may, for example, initially be displayed in response to detecting an input operation corresponding to a selection of an initial character string selection range, which may be subsequently altered and displayed using methods discussed herein. In one aspect of the present disclosure, the cursors(s) may be displayed on the display 7 at coordinates corresponding to the starting point and end point of an initially selected character string selection range. As discussed in further detail later, a displayed position of the cursor(s) may, in certain aspects of the present disclosure, be altered based on touch input operations performed on an operation surface of touch panel 8; and the controller 1 and/or display controller 14 may, in certain aspects of the present disclosure, calculate the moving distance and/or speed of the displayed cursor when altering the initial character string selection range, where the calculation may be based on the actual detected moving speed and/or distance of the instruction object when the input operation is performed, or further based on an initial coordinate at which the input operation is performed.

The antenna 2 transmits/receives electromagnetic wave signals between base stations for performing radio-based communication, such as the various forms of cellular telephone communication.

The communication processor 3 controls the communication performed between the mobile device 100 and other external devices. For example, the communication processor 3 may control communication between base stations for cellular phone communication.

The speaker 4 emits an audio signal corresponding to audio data supplied from the voice processor 6.

The microphone 5 detects surrounding audio, and converts the detected audio into an audio signal. The audio signal may then be output to the voice processor 6 for further processing.

The voice processor 6 demodulates and/or decodes the audio data read from the memory 10, or audio data received by the communication processor 3 and/or a wireless communication processing section 12. Additionally, the voice processor 6 may decode audio signals obtained by the microphone 5.

The exemplary mobile device 100 may also include a display 7, a touch panel 8, an operation processor 9, the memory 10, and the wireless communication processor 12 connected to an antenna 11.

The display 7 may be a Liquid Crystal Display (LCD), or another known display screen technology. In addition to displaying images, the display 7 may display operational inputs, such as numbers or icons, which may be used for control of the mobile device 100. The display 7 may additionally display a graphical user interface with which a user may control aspects of the mobile device 100.

The touch panel 8 may include one or more touch sensors for detecting an input operation on an operation surface of the touch panel 8. In certain aspects of the present disclosure, the touch panel 8 may be disposed adjacent to the display 7 (e.g., laminated), or may be formed integrally with the display 7. The touch panel 8 and the display 7 may be surrounded by a protective casing, which may also enclose the other elements included in the mobile device 100.

For simplicity, the present disclosure assumes the touch panel 8 is a capacitance-type touch panel technology; however, it should be appreciated that aspects of the present disclosure may easily be applied to other touch panel types (e.g., resistance type touch panels) with alternate structures. In certain aspects of the present disclosure, the touch panel 8 may include transparent electrode touch sensors arranged in the X-Y direction on the surface of transparent sensor glass.

A touch panel driver may be included in the touch panel 8 for control processing related to the touch panel 8, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel 8. Additionally, the touch panel driver and touch panel 8 may detect when an instruction object, such as a finger, is within a predetermined distance from an operation surface of the touch panel 8. That is, the instruction object does not necessarily need to directly contact the operation surface of the touch panel 8 for touch sensors to detect the instruction object and perform processing described herein. Signals may be transmitted by the touch panel 8 driver, e.g., in response to a detection of a touch operation, in response to a query from another element, based on timed data exchange, etc.

The operation processor 9 may include one or more buttons or similar external control elements, which may generate an operation signal based on a detected input by the user. These operation signals may be supplied to the controller 1 for performing related processing and control. In certain aspects of the present disclosure, the processing and/or functions associated with external buttons and the like may be performed by the controller 1 in response to an input operation on the touch panel 8 rather than the external button, key, etc. In this way, external buttons on the mobile device 100 may be eliminated in lieu of performing inputs via touch operations, thereby improving water tightness.

The memory 10 may include, e.g., Read Only Memory (ROM), Random Access Memory (RAM), or a memory array comprised of a combination of volatile and non-volatile memory units. The memory 10 may be utilized as working memory by the controller 1 while executing the processing and algorithms of the present disclosure. Additionally, the memory 10 may be used for long-term storage, e.g., of images and information related thereto. For example, arrangement positioning information of other terminal devices, identification information of terminal devices, connection identification information required for radio/wireless communication, and information allocated with respect to arrangement/layout positions may be stored in the memory 10.

The antenna 11 may transmit/receive electromagnetic wave signals to/from other external apparatuses, and the wireless communication processing section 12 may control the wireless communication performed between the other external apparatuses. Bluetooth and Wi-Fi are non-limiting examples of wireless communication protocols that may be used for inter-device communication.

The exemplary mobile device 100 may further include an operation determination processor 13 and a display controller 14.

The operation determination processor 13 may determine features of touch operations detected on the operation surface of the touch panel 8. In certain aspects of the present disclosure, the operation determination processor 13 may classify an input operation based on the determined features of the input. For example, the operation determination processor 13 may classify a detected input operation as a "tap," a "swipe," a prolonged tap exceeding a predetermined time, a "pinch-in," or a "pinch-out." Tap operations correspond to input operations during which the instruction object briefly contacts the operation surface of the touch panel 8 with substantially little movement from the initially contacted coordinate. Swipe operations correspond to input operations during which the instruction object is moved from the initially contacted coordinate to another coordinate while the instruction object maintains contact with the operation surface of the touch panel 8. Pinch-in and pinch-out operations correspond to input operations during which two or more instruction objects contact the operation surface of the touch panel 8 and move inward (or outward for pinch-out) towards (or away from) each other while maintaining contact with the operation surface. The operation determination processor 13 may, in one aspect of the present disclosure, perform its functions based on received inputs corresponding to electrostatic capacitance (or other corresponding sensor data) values, coordinates, distribution patterns, and detected changes thereof. The operation determination processor 13 may output a determined movement speed and/or distance of an instruction object during a touch input operation based on inputs from the touch panel 8 sensors.

The display controller 14 may alter the displayed position of a cursor (or other displayed boundary of a character string selection range) based on a calculated moving distance and/or speed of the cursor determined by the controller 1, thereby altering the boundaries of the initially displayed character string selection range.

Figure 2A:
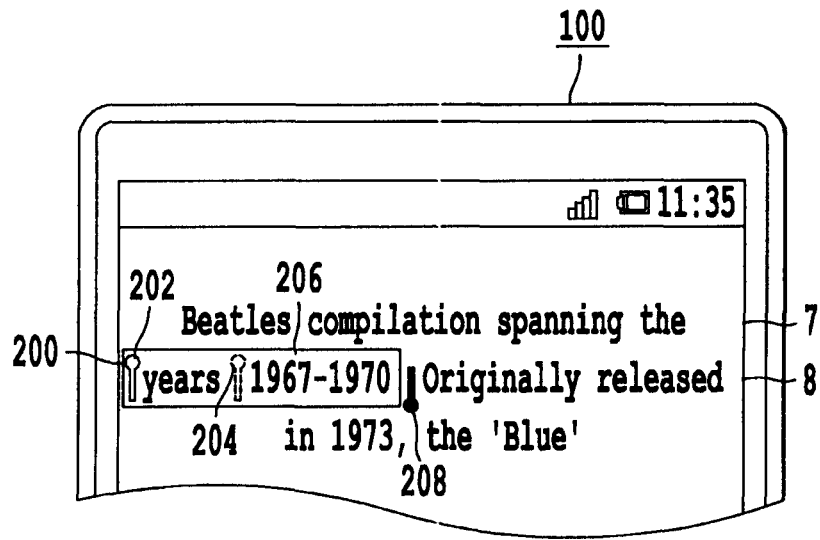
FIGS. 2A and 2B illustrate a non-limiting example of altering a character string selection range according to one aspect of the present disclosure.
Figure 2B:
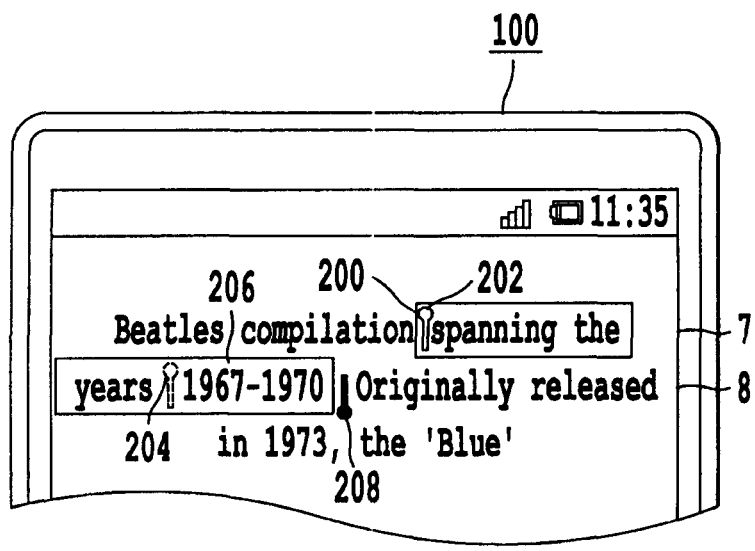

Next, FIGS. 2A and 2B illustrate a non-limiting example of altering a character string selection range according to one aspect of the present disclosure. The example of FIG. 2A illustrates a small (fine) adjustment of a displayed character string selection range, and FIG. 2B illustrates an example of a large (coarse) adjustment in a displayed character string selection range. For the examples discussed hereinafter, a character string is displayed on the display 7 stating, "Beatles compilation spanning the years 1967-1970. Originally released in 1973, the 'Blue'". A portion of this character string displayed on the display 7 is outlined, and the outlined portion corresponds to character string selection range 206. In certain aspects of the present disclosure, the character string selection range 206 may be emphasized from a remaining portion of the character string by other methods (e.g., highlighting, shading, etc.) The character string selection range 206 is bounded by a starting point cursor 202 and an endpoint cursor 208. The starting point cursor 202 is represented in the figures as a white cursor with a white "knob" attached to the upper side of the starting point cursor 202, and the endpoint cursor 208 is represented in the figures as a black cursor with a black knob attached to a lower end of the endpoint cursor 208. Position 204, represented by a dashed cursor, represents a starting position of the starting point cursor 202 prior to adjustment of the character string selection range 206. That is, when performing a touch operation to change a portion of a displayed character string on the display 7, it is assumed that the starting position of the starting point cursor corresponds to the position 204 prior to the change in character string selection range 206.

As a non-limiting example of changing a position of the starting point cursor 202 to alter the character string selection range 206, a user may perform a touch operation on the touch panel 8 with an instruction object such as user's finger, whereby the touch operation corresponds to the position 204 and the user maintains contact with the operation surface of the touch panel 8 while moving the instruction object to the left such that the end position of the starting point cursor corresponds to the position of the starting point cursor 202 in FIG. 2A (i.e., the instruction object moves from the position 204 to position 200). In the examples of FIGS. 2A and 2B, it is assumed that the user performs a touch operation with the instruction object by moving the instruction object on the operation surface of the touch panel 8 the same distance in both FIG. 2A and FIG. 2B. That is, although the change in the character string selection range 206 is shown as being different than FIGS. 2A and 2B, the adjustment of the character string selection range 206 resultant from performing the above-described swipe operation is assumed to be performed such that the instruction object moves the same distance on the operation surface of the touch panel 8 in both examples.

Referring to FIG. 2A, the starting point cursor 202 is moved from the position 204 corresponding to the left side of the "1" of "1967" to the position 200 corresponding to the left side of the "y" in "years." On the other hand, the starting point cursor 202 in FIG. 2B is moved from the position 204 corresponding to the "1" of "1967" to the position 200 corresponding to the left hand side of the "s" of "spanning." A change in the size of the character string selection range 206 via the positional changes of the starting point cursor 202 in FIGS. 2A and 2B illustrates aspects of changing a character string selection range based on features of a performed touch operation. For example, while the touch operation performed in FIGS. 2A and 2B is assumed to be performed across the same distance of the operation surface of the touch panel 8, the two touch operations may differ in terms of the speed at which the touch operation is performed, the length of time at which the user makes contact with the operation surface using the instruction object, the number of fingers in contact with the operation surface at the time of the touch operation, the initial and/or final coordinate at which the instruction object contacts the operation surface, etc. Further, while the examples of FIGS. 2A and 2B illustrate a case in which a starting point cursor 202 is moved when altering the character string selection range 206, a skilled artisan will easily appreciate that these features may be easily adapted such that a position of endpoint cursor 208 may be changed when altering the size of a selected character string selection range.

Figure 3A:
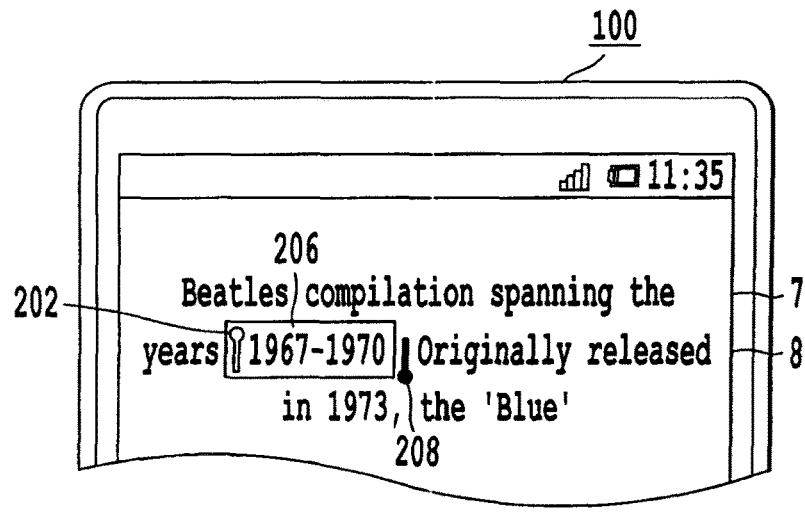
FIGS. 3A-3C illustrate another non-limiting example of altering a character string selection range according to one aspect of the present disclosure.
Figure 3B:
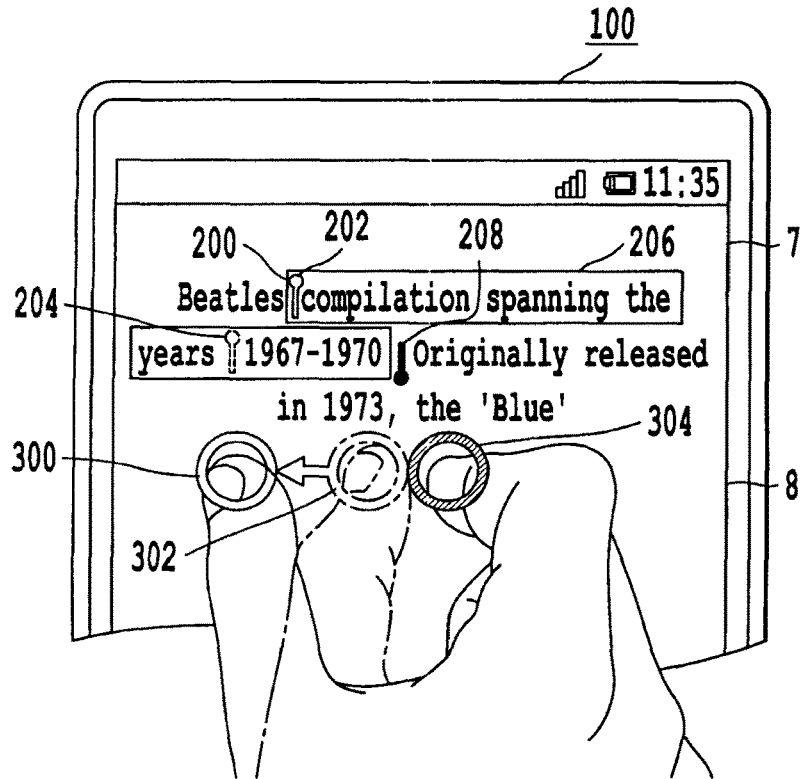
Figure 3C:
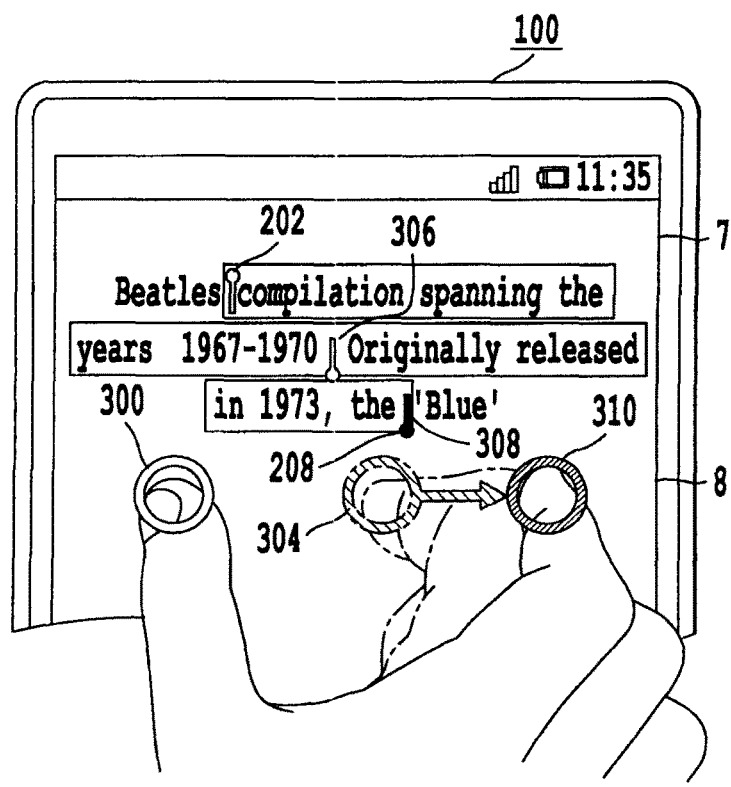

Next FIGS. 3A through 3C illustrate another non-limiting example of altering a character string selection range on a touch panel display. Referring first to FIG. 3A, FIG. 3A illustrates an initial condition in which the character string selection range 206 is selected on the touch panel 8. The initially selected character string selection range 206 is shown bounded by the starting point cursor 202 and the endpoint cursor 208, and corresponds to the "1967-1970" portion of the full character string shown displayed on the display 7. As a non-limiting example of initially selecting the character string selection range 206 shown in FIG. 3A, the user may double tap a location on the operation surface of the touch panel 8 corresponding to the character string portion "1967-1970," in which case the selected portion of the character string corresponding to the character string selection range 206 shown in FIG. 3A is highlighted or otherwise emphasized on the display 7. Further predetermined input operations performed on the operation surface of the touch panel 8 may correspond to selecting a portion of the character string, such as performing a prolonged touch operation in which the instruction object touches the operation surface for a predetermined amount of time, thereby selecting a corresponding portion of a character string. In response to detecting an input operation corresponding to selecting a portion of a displayed character string, such as that shown in FIG. 3A, the mobile device 100 may be configured to receive a second input operation for varying the range of the character string selection range selected by the initial touch operation. FIGS. 3B and 3C illustrate non-limiting examples of performing such an input operation where the range of the character string selection range 206 is varied in response to a touch operation performed on an operation surface of the touch panel 8.

Referring now to FIG. 3B, FIG. 3B illustrates a state in which a user is contacting the operation surface of the touch panel 8 with his or her thumb and forefinger. It should be appreciated that the example shown in FIG. 3B may be adapted such that other fingers (or another instruction object, e.g., a stylus) may be used in performing the input operation. Further, it should be appreciated that aspects of the present disclosure may be adapted such that a different number of fingers may be used when performing the input operations. In the example of FIG. 3B, the user's forefinger is shown contacting the operation surface of the touch panel 8 at a position corresponding to contact point 304, and user's thumb is contacting the operation surface at an initial position corresponding to contact point 302. While simultaneously maintaining contact with the operation surface with the forefinger and thumb, the user may then slide his or her thumb to a position on the operation surface of the touch panel 8 corresponding to contact point 300. In one aspect of the present disclosure, the mobile device 100 may correspond a displayed position of the starting point cursor 202 to the user's thumb and a displayed position of the endpoint cursor 208 to the user's forefinger. More broadly, the mobile device 100 may correspond a simultaneous contact of two or more instruction objects on the operation surface of the touch panel 8, and correspond a position/movement of the starting point cursor 202 and/or the endpoint cursor 208 to a movement and/or a relative location of the two or more instruction objects that are detected. In the example of FIG. 3B, in response to detecting a movement of the left-most finger (i.e. the user's thumb) from the contact point 302 to the contact point 300, the position of the starting point cursor 202 may be moved from a position corresponding to position 204 to a final position corresponding to position 200. In other words, the controller 1 may control the displayed interface such that the character string selection range 206 is expanded from an initial range corresponding to "1967-1970" to a final range of "compilation spanning the years 1967-1970."

Referring now to FIG. 3C, FIG. 3C illustrates another non-limiting example in which the character string selection range 206 that was expanded in the example of FIG. 3B is further expanded via a movement of the endpoint cursor 208. In the example of FIG. 3C, the user's thumb and forefinger are maintained in simultaneous contact with the operation surface of the touch panel 8. The user's thumb is in a position on the operation surface corresponding to the contact point 300, while the user's forefinger is moved from a position corresponding to contact point 304 to a final position corresponding to a contact point 310. In response to detecting the movement of the user's forefinger from the contact point 304 to the contact point 310, in one aspect of the present disclosure the controller 1 may control the interface shown on the display 7 such that a displayed position of the endpoint cursor 208 is changed from a position corresponding to position 306 to a final position corresponding to position 308. That is, the character string selection range 206 of FIG. 3B may be further expanded from "compilation spanning the years 1967-1970" to a final range of "compilation spanning the years 1967-1970. Originally released in 1973, the". It should be appreciated that while the examples of FIGS. 3B and 3C are shown expanding the range of the character string selection range 206 iteratively, the skilled artisan will easily appreciate that simultaneous movements of the user's thumb and forefinger may result in simultaneous movements of the starting point cursor 202 and the endpoint cursor 208 such that the range of selected character strings is expanded via a "pinch out" touch operation. That is, a selected character string range may be simultaneously spread in a leftward (upward) and rightward (downward) direction via changing positions of the starting point cursor 202 and the endpoint cursor 208.

Figure 4A:
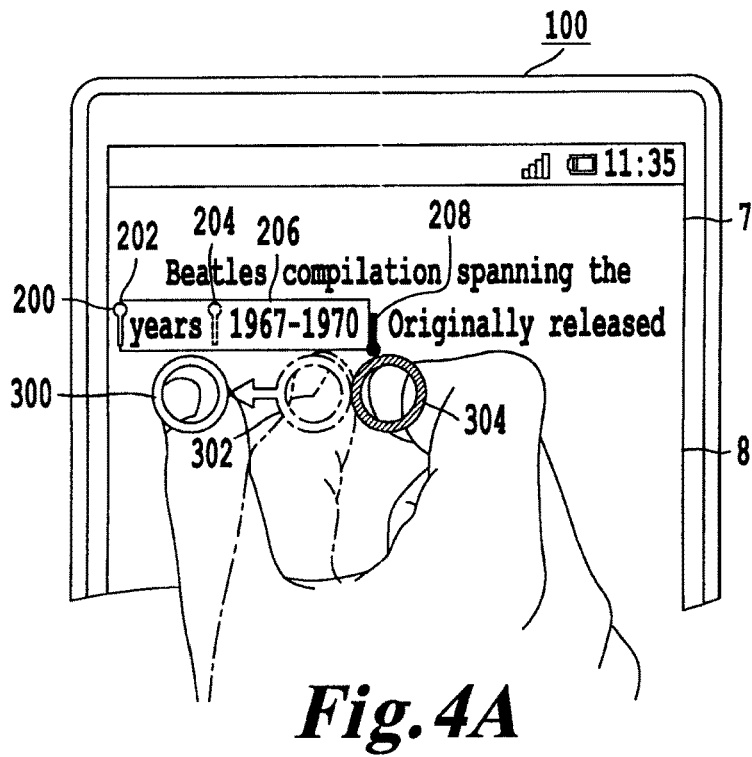
FIGS. 4A and 4B illustrate a non-limiting example of altering a character string selection range change based on an initial location at which an input operation is performed, according to one aspect of the present disclosure.
Figure 4B:
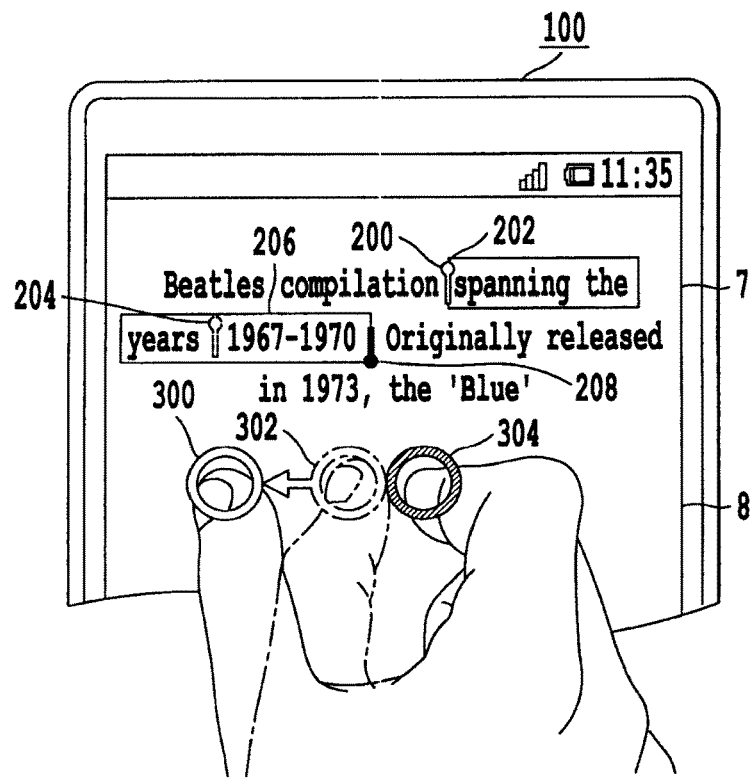

Next, FIGS. 4A and 4B illustrate a non-limiting example in which aspects of varying a size of the character string selection range 206 change based on a location on the operation surface of the touch panel 8 at which the instruction object is making contact when performing a touch operation. Referring first to FIG. 4A, FIG. 4A illustrates a first mode of expanding the character string 206 in response to detecting a touch operation on the operation surface of the touch panel 8 at a position corresponding to the initially selected character string selection range 206 (or within a predetermined range of the initially selected character string selection range 206). FIG. 3A illustrates a user's thumb and forefinger contacting the operation surface at a position substantially near an initial character string selection range corresponding to "1967-1970". The user's thumb and forefinger are respectively initially contacting the operation surface at the contact point 302 and the contact point 304. Following initial contact of the user's thumb and forefinger, the user's thumb is moved from the contact point 302 to a final position corresponding to the contact point 300. In response a detected movement of the user's thumb from the contact point 302 to the contact point 300, the character string selection range 206 is expanded by moving the starting point cursor 202 from an initial position corresponding to position 204 to a final position corresponding to the position 200.

Next, FIG. 4B illustrates another non-limiting example in which a similar touch operation as that described above for FIG. 4A is performed. However, the touch operation is performed with the user contacting the operation surface of the touch panel 8 at a position that is a predetermined distance away from an initially selected character string selection range 206. In the example FIG. 4B, the user's thumb and forefinger respectively contact the contact point 302 and the contact point 304 at a lower portion of the touch panel 8 such that the contact points are not in the vicinity of the initially selected character string selection range 206. The user's thumb in this example is moved from its initial position corresponding to the contact point 302 to a final contact position corresponding to the contact point 300. The movement in the example of FIG. 4B is similar to that described above for FIG. 4A, and this example assumes that the user's thumb is moved a distance that is substantially the same as in the example of FIG. 4A (i.e. a distance on the operation surface from the contact point 302 to the contact point 300 is substantially the same for both FIGS. 4A and 4B). As illustrated in FIG. 4B, while the user's thumb is moved substantially the same distance as that shown in the example of FIG. 4A, the final position of the starting point cursor 202 is different in FIG. 4B than in the example of FIG. 4A. In particular, the starting point cursor 202 is moved backwards in the full character string shown in the example such that the character string selection range 206 is expanded more in FIG. 4B than in FIG. 4A.

The differences in the initial and final position of the starting point cursor 202 in the examples of FIGS. 4A and 4B may, in one aspect of the present disclosure, result from the mobile device 100 controlling the speed at which the starting point cursor 202 moves, based on a location on the operation surface of the touch panel 8 at which the touch operation is performed. For example, in response to detecting the touch operation of FIG. 4B at a position on the operation surface of the touch panel 8 in excess of the predetermined distance from the initially selected character string selection range 206, the starting point cursor 202 may be moved from its initial position 204 at a faster rate of speed, which correlates to a larger movement distance. Similarly, the starting point cursor 202 may be moved from its initial position 204 in FIG. 4A at a speed corresponding to the speed at which the user's thumb moves in FIG. 4A, or a speed that is slower than the movement of the user's thumb. In broader terms, the mobile device 100 may control the speed at which the starting point cursor 202 and/or the endpoint cursor 208 moves during touch operations for expanding the character string 206, and the speed of movement (and corresponding movement distance) may be based on the position on the operation surface of the touch panel 8 at which the user performs the touch operation.

In one aspect of the present disclosure, the mobile device 100 may move the cursors in expanding the character string selection range at a first speed when a touch operation is performed at a position corresponding to the initially selected character string selection range, and move the cursors at a second speed when the touch operation is performed at a predetermined distance away from the initially selected character string selection range. That is, the mobile device 100 may move the starting and/or endpoint cursors at discrete speeds based on the detected position of the touch operation. In another aspect of the present disclosure, the movement speed of the starting and/or endpoint cursors may be continuous such that, for example, the speed is increased/decreased directly or indirectly proportionally to the distance from the initially selected character string selection range 206 at which the user performs the touch operation. In another aspect of the present disclosure, the mobile device 100 may detect a speed at which the user's thumb and/or other instruction object moves along the operation surface of the touch panel 8, and adjust the size of the character string selection range based on the detected speed. The detected speed may be utilized in one aspect of the present disclosure as a reference speed for adjusting the position of the starting point and/or endpoint cursors, or another speed may be used as a reference speed. Varying speed, distance, etc. of cursor movement when altering a character string selection range may, e.g., allow performing substantially the same gesture during the input operation for both fine and coarse control of the character string selection range.

Figure 5:
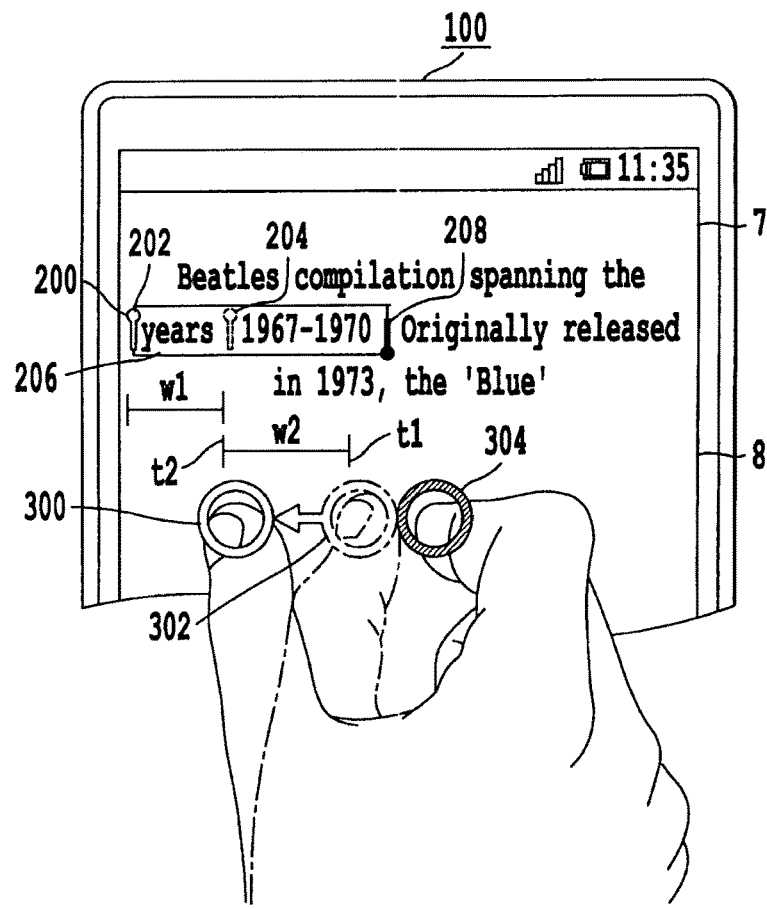
FIG. 5 illustrates a non-limiting example in which a character string selection range is altered by a distance that is different than a distance that an instruction object moves on the operation surface of the touch panel when performing an input operation, according to one aspect of the present disclosure.

Next, FIG. 5 illustrates a non-limiting example in which a cursor corresponding to a displayed character string selection range is moved a distance that is different than a distance that an instruction object moves on the operation surface of the touch panel when performing an input operation. Referring to FIG. 5, the mobile device 100 initially displays on the display 7 an initial character string selection range including the characters displayed between the position 204 and the endpoint cursor 208. The displayed initial character string selection range may be altered in response to the mobile device 100 detecting an input operation on the operation surface of the touch panel 8. In the example of FIG. 5, the input operation corresponds to a user initially contacting the operation surface of the touch panel 8 with his or her thumb and forefinger at contact points 302 and 304, respectively. The example of FIG. 5 assumes that the movement of the starting point cursor 202 corresponds to a position of the user's thumb, and the movement of the endpoint cursor 208 corresponds to the detected position of the user's forefinger. While maintaining simultaneous contact with the operation surface, the user performs the input operation by moving his or her thumb from the contact point 302 to the contact point 300. The distance at which the user moves his or her thumb corresponds to distance w2 shown in FIG. 5. Further, the example of FIG. 5 assumes that the movement of the user's thumb begins at time t1 and ends at time t2. By determining the time elapsed and distance traveled during the performance of the input operation, the mobile device 100 may determine various aspects of the input operation such as the speed and/or acceleration of the user's thumb during the input operation.

In response to the detected movement of the user's thumb as discussed above, the character string selection range 206 is altered by moving the starting point cursor 202 from the position 204 to the position 200. That is, the input operation results in the character string selection range 206 being expanded from its initially displayed range by moving the starting point cursor to the left. The distance at which the starting point cursor 202 moves in this example corresponds to distance w1 shown in FIG. 5. The distance w1 may be different than the distance w2, or the distances may be substantially the same. In this way, a determination may be made as to whether the distance of the starting point cursor 202 and/or the endpoint cursor 208 is changed such that the cursor movement is the same or different than the corresponding movement of the instruction object during the input operation, whereby the determination is based upon aspects of the input operation. In one aspect of the present disclosure, the determination as to the speed of movement of the starting and/or endpoint cursors may be based on a detected initial coordinate at which the instruction object is detected to be performing the input operation. In this case, the speed and/or distance at which the cursors are moved may be determined based on a determination as to whether the initial coordinate at which the input operation takes place is greater than or less than a predetermined distance from a display coordinate corresponding to, for example, the displayed initial character string selection range, the displayed character string in its entirety, an image displayed on the display 7, or another predetermined coordinate. In one aspect of the present disclosure, the moving distance w1 of the starting point cursor 202 may be set such that it is smaller than the moving distance w2 of the instruction object during the input operation when the time interval t2−t1 is large (i.e., when the moving speed of the user's thumb is slow, e.g., below a predetermined speed). In another aspect of the present disclosure, the moving distance w1 of the starting point cursor 202 may be controlled such that it is larger than the distance w2 of the movement of the user's thumb during the input operation when the time differential t2−t1 is small (i.e., when the moving speed of the user's thumb is quick, e.g., above a predetermined speed).

The skilled artisan will easily appreciate that a movement of a cursor corresponding to a displayed character string selection range may be moved in other ways not specifically described in the above example, based on aspects of the detected input operation. For example, the speed and/or distance of the movement of the cursors when altering a displayed character string selection range may be changed discretely or continuously based on speed, acceleration, position of the instruction object, or other aspects of a detected movement of an instruction object during an input operation.

Figure 6:
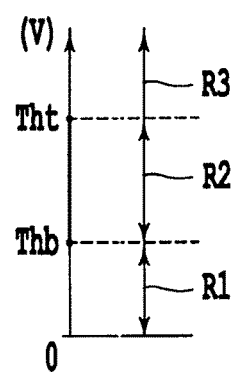
FIG. 6 illustrates exemplary aspects of character string selection range alteration based on predetermined thresholds of instruction object movement, according to one aspect of the present disclosure.

Next, FIG. 6 illustrates a non-limiting example of relationships between a detected speed and/or distance traveled by an instruction object during input operation and the distance at which a cursor of a character string selection range is moved in response to detecting the input operation. The moving speed (V) in this example is shown on the Y axis. In the example of FIG. 6, when a detected moving speed of a user's finger or other instruction object used during an input operation is detected to be below a minimum threshold value Thb, the controller 1 may control the displayed interface such that the movement of the starting and/or endpoint cursor is changed such that the moving speed is slower than the actual detected speed of the instruction object during the input operation. That is, when the detected speed of the instruction object during the input operation falls in the range shown as R1 in FIG. 6, the moving speed of a cursor is made slow and the moving distance of the cursor in response to detected input operation is made smaller than the actual moving distance of the instruction object during the input operation. When the actual moving speed V of the instruction object is greater than the minimum threshold value Thb but less than a maximum threshold value Tht, the starting and/or endpoint cursors may be moved in response to detecting the input operation at a speed that is substantially the same as the moving speed of the instruction object during the input operation. That is, when the detected movement speed of the instruction object during the input operation falls within the range R2 shown in FIG. 6, the moving speed of the starting and/or endpoint cursors when altering a displayed character string selection range corresponds to the detected moving speed of the instruction object during the input operation. In the case in which the detected moving speed of the instruction object during the input operation is determined to be greater than the maximum threshold value Tht, the controller 100 may control the displayed interface such that the moving speed of a displayed starting and/or endpoint cursor when altering a size of a displayed initial character string selection range is greater than the actual detected speed of the instruction object during the input operation. That is, when the actual moving speed of the instruction object during the input operation falls in the range R3 shown in FIG. 6, the moving speed of the starting and/or endpoint cursors when altering a displayed character string selection range size is greater than the actual moving speed of the instruction object, thereby resulting in the moving distance of the cursor being greater than the moving distance of the instruction object during the input operation.

While moving speed of starting and/or endpoint cursors is discussed herein with respect to changing a position of a cursor when altering a character string selection range on an interface, a skilled artisan will easily appreciate that the moving distance of the starting and/or endpoint cursors is directly proportional to the moving speed when the cursors are moved in response to detecting an input operation. In other words, aspects of the present disclosure may easily be adapted such that a moving distance of a starting or endpoint cursor when altering a displayed character string selection range in response to an input operation may be changed such that it is the same or different than the actual detected moving distance of an instruction object during the input operation.

Figure 7:
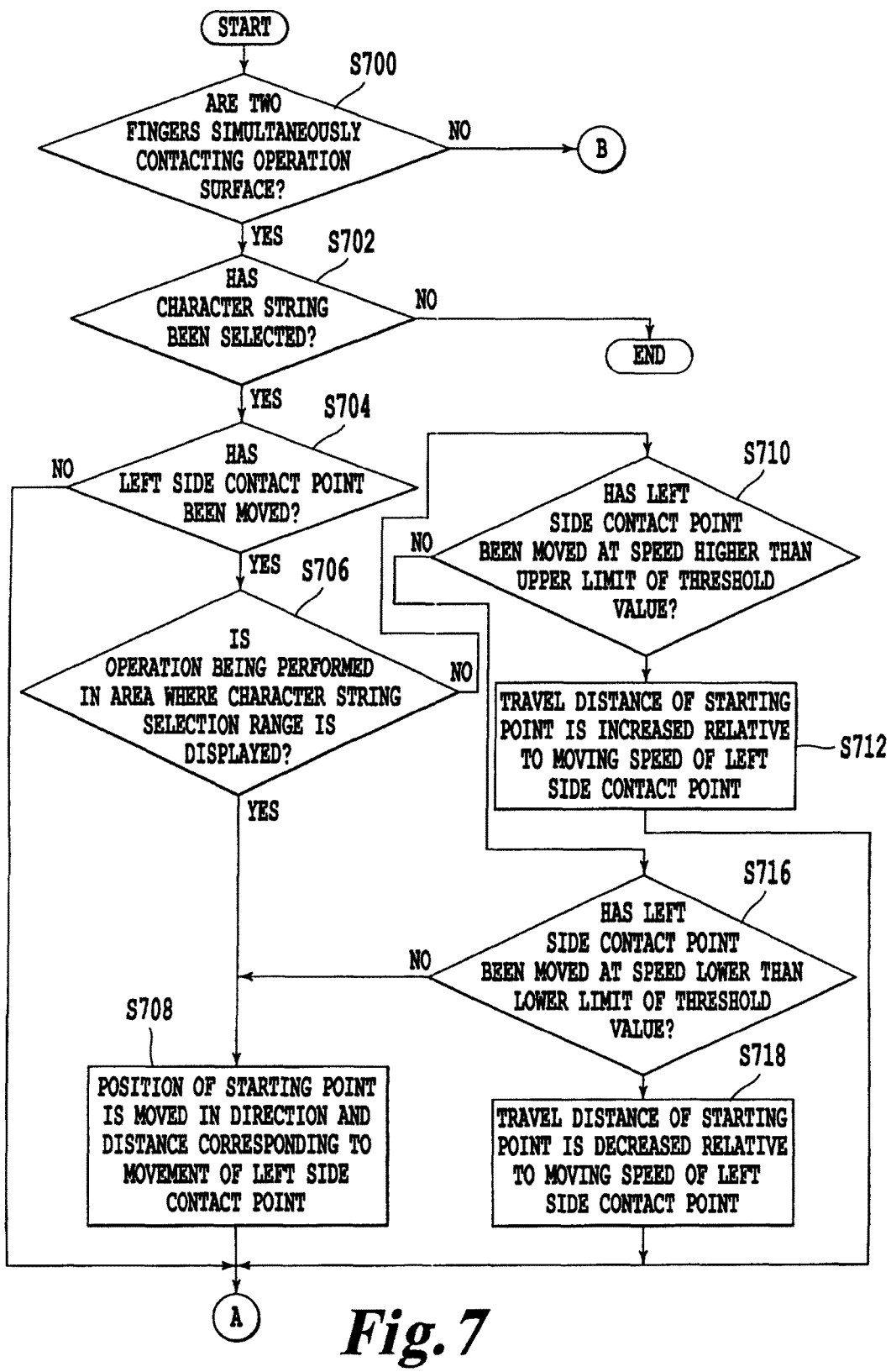
FIGS. 7 and 8 illustrate exemplary algorithmic flow charts for altering a character string selection range according to one aspect of the present disclosure.
Figure 12:
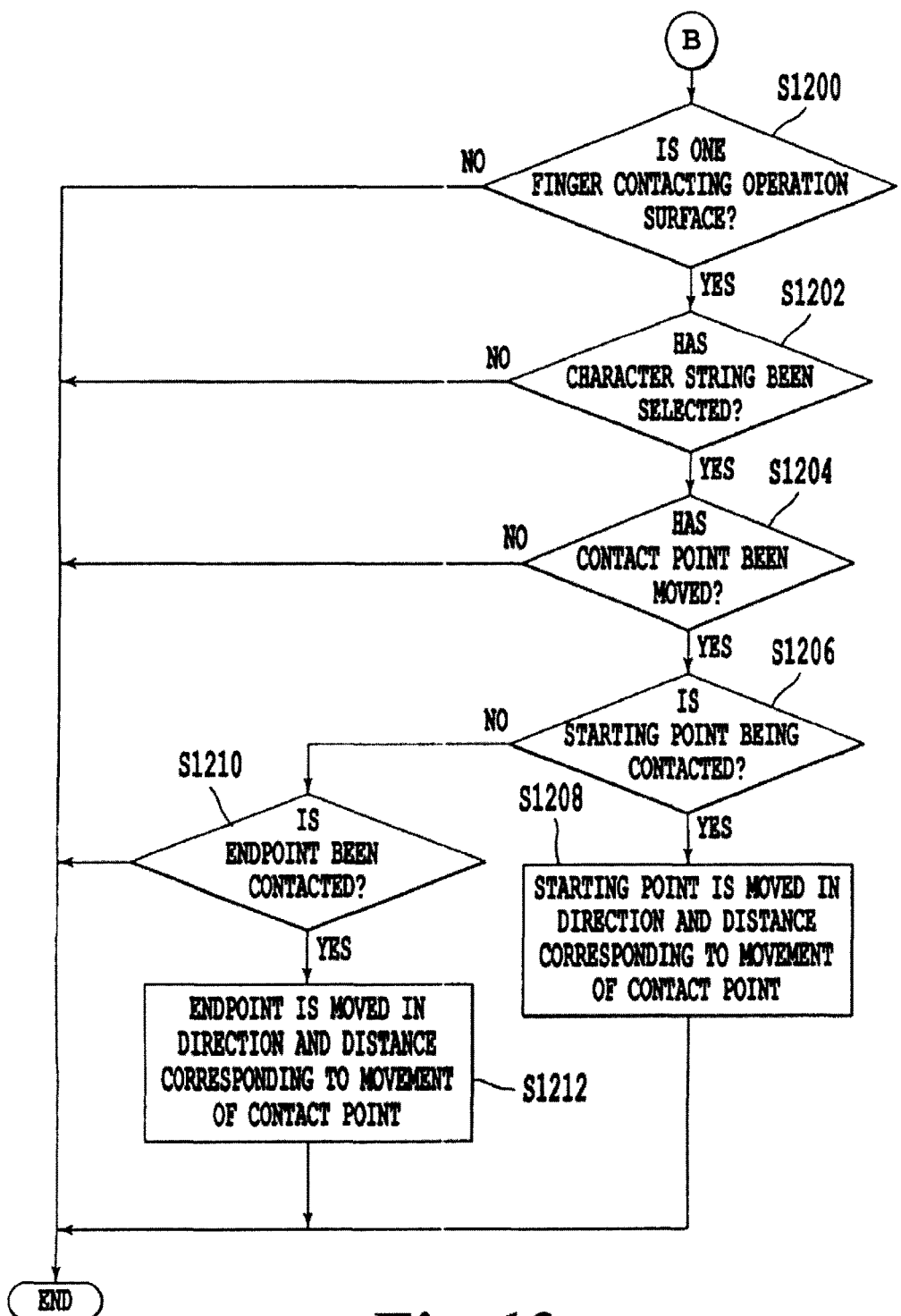
FIG. 12 illustrates an exemplary algorithmic flowchart for altering a character string selection range using a single instruction object, according to one aspect of the present disclosure.

Next, FIG. 7 illustrates a non-limiting example of an algorithmic flowchart for altering a size of a displayed character string selection range in response to a detected input operation. Referring to FIG. 7, the display controller 14 determines at step S700 whether two instruction objects (in this example the instruction objects are assumed to be a user's fingers) are contacting the operation surface of the touch panel 8 simultaneously. If two fingers are not determined to be contacting the operation surface simultaneously at step S700, further processing discussed later with respect to FIG. 12 is performed. Otherwise, the controller 1 determines at step S702 whether the displayed interface is in a state in which an initial character string has been selected.

That is, the controller 1 determines whether the displayed interface includes an initial character string selection range displayed on the display 7. As a non-limiting example, an initial character string selection range may be displayed in response to a previous input operation, such as a tap, a double tap, or a prolonged tap of the operation surface using the instruction object.

Figure 8:
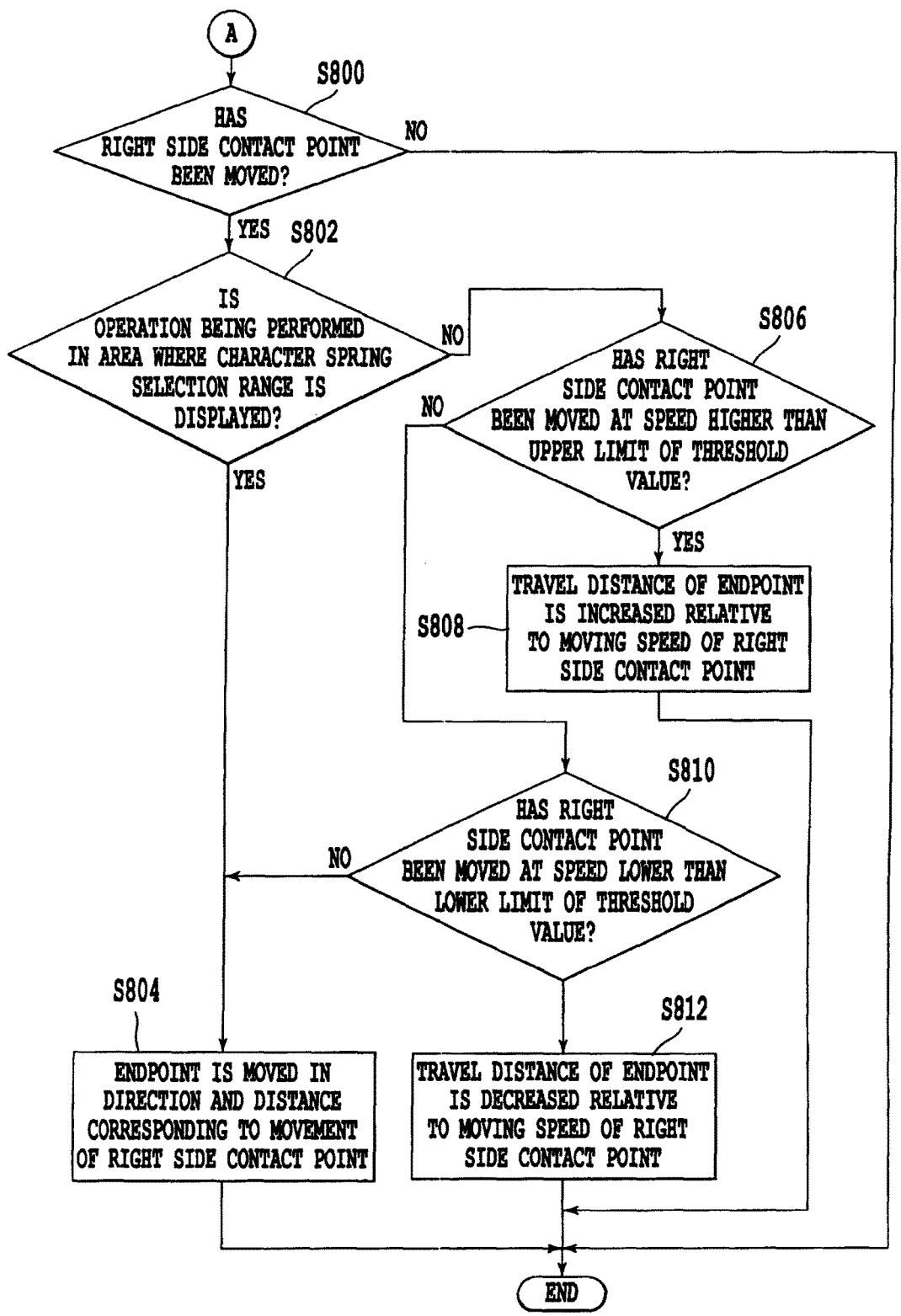

At step S704, the display controller 14 and/or the controller 1 determines whether the leftmost finger in contact with the operation surface of the touch panel 8 is moved. For example, the display controller 14 and/or the controller 1 determines at step S704 whether a user's thumb is moved as in the example shown in FIG. 3B. If the leftmost finger is determined not to be moving at step S704, additional processing discussed later with respect to FIG. 8 is performed. Otherwise, the display controller 14 and/or the controller 1 determine at step S706 if the input operation of step S704 is performed at an initial coordinate corresponding to a display coordinate of the initially selected/displayed character string selection range. For example, the display controller 14 and/or the controller 1 determine at step S706 whether the input operation is performed in a near vicinity (within a predetermined threshold range) of the initially selected/displayed character string selection range such as in the example shown in FIG. 4A.

If an affirmative determination is made at step S706, the display controller 14 at step S708 moves the starting point cursor in a direction and distance corresponding to the detected movement of the leftmost finger. In other words, the initially displayed character string selection range is altered by moving the starting point cursor in the same direction and at substantially the same speed as the detected movement of the user's leftmost finger.

Otherwise, if the display controller 14 and/or the controller 1 determine at step S706 that the input operation is being performed at a predetermined distance away from the initially selected/displayed character string selection range, the controller 1 determines at step S710 whether the user's leftmost finger is moved at a speed that is higher than an upper limit threshold value during the input operation. If so, the controller 1 controls the displayed interface such that the traveled distance of the starting point cursor when moved in response to detecting the input operation is increased relative to the actual moving speed of the leftmost finger. That is, the controller 1 at step S712 controls the interface such that the starting point cursor is moved at a speed that is higher than the actual detected speed of the user's leftmost finger, thereby moving the starting point cursor a larger movement distance than the actual movement distance of the user's leftmost finger during the input operation.

If the controller 1 determines at step S710 that the detecting moving speed of the user's leftmost finger is not above the upper limit threshold value, the controller 1 at step S716 determines whether the actual detected moving speed of the user's leftmost finger is lower than a lower limit threshold value. If the actual detected movement of the user's leftmost finger during the input operation is determined to not be lower than the lower limit threshold value at step S716 (i.e., between the upper and lower limit thresholds), the controller 1 controls the displayed interface such that the starting point cursor is moved at a corresponding direction and speed as the actual detected movement of the user's leftmost finger during the input operation. Otherwise, the controller 1 at step S718 controls the displayed interface such that the travel distance of the starting point cursor in response to the detected input operation is decreased relative to the actual moving speed of the user's leftmost finger. In other words, the controller 1 moves the starting point cursor in response to the detected movement of the user's leftmost finger such that the moving speed of the starting point cursor is lower than the actual moving speed of the user's leftmost finger during the input operation, thereby resulting in a travel distance of the starting point cursor that is lower than the actual travel distance of the user's leftmost finger during the input operation.

Next, FIG. 8 illustrates an exemplary algorithmic flowchart with similar features as those discussed above with respect to FIG. 7. In particular, FIG. 8 illustrates processing related to altering a displayed character string selection range based on a detected movement of the rightmost finger when two fingers are detected to be contacting an operation surface of the touch panel 8. At step S800, the display controller 14 and/or the controller 1 determines whether the rightmost finger of the two fingers detected at step S700 has been moved.

If the rightmost finger is determined to be moving at step S800, the display controller 14 and/or the controller 1 determines at step S802 whether the input operation and the movement of the user's rightmost finger occurs in an area on the operation surface at which an initial character string selection range is being displayed (i.e., similar to the case discussed above for step S706 of FIG. 7). If so, the controller 1 controls the interface at step S804 such that the endpoint cursor of the initially displayed character string selection range is moved in a direction and distance corresponding to the detected movement of the user's rightmost finger. That is, the controller 1 controls the interface such that the initially displayed character string selection range is altered by moving the endpoint cursor at a movement speed that is substantially the same as the detected movement speed of the user's rightmost finger during the input operation.

Otherwise, if the display controller 14 and/or the controller 1 determine at step S802 that the input operation is being performed at an area of the operation surface that is a predetermined distance away from a display coordinate corresponding to the initially displayed character string selection range, the controller 1 at step S806 determines whether the user's rightmost finger is moved at a speed that is higher than an upper limit threshold value during the input operation. If the detected movement speed of the user's finger at step S806 is above the upper limit threshold value, the controller 1 at step S808 controls the interface such that the movement distance of the endpoint cursor in response to the detected movement of the user's rightmost finger is increased relative to the actual movement speed of the user's rightmost finger during the input operation. In other words, the controller 1 controls the interface at step S808 such that the initially displayed character string selection range is altered by moving the endpoint cursor at a higher speed than the actual detected speed of the user's rightmost finger during the input operation, thereby resulting in a travel distance of the endpoint cursor that is greater than the actual travel distance of the user's rightmost finger during the input operation.

If the actual detected movement speed of the user's rightmost finger during the input operation is found to be below the upper limit threshold value at step S806, the controller 1 at step S810 determines whether the user's rightmost finger has been moved during the input operation at a movement speed that is lower than a lower limit threshold value. If the actual detected speed of the user's rightmost finger is below the lower limit threshold value, the controller 1 at step S812 controls the interface such that the travel distance of the endpoint cursor is decreased relative to the actual detected movement speed of the user's rightmost finger. In other words, the controller 1 controls the interface such that the initially displayed character string selection range is altered by moving the endpoint cursor at a speed that is lower than the actual detection speed of the user's rightmost finger during the input operation, thereby resulting in a travel distance of the endpoint cursor that is lower than the actual travel distance of the user's rightmost finger during the input operation.

If the actual detected speed of the user's rightmost finger during the input operation is above the lower limit threshold value at step S810 (i.e., the actual speed is between the upper and lower limit threshold values), the controller 1 controls the interface such that the endpoint cursor is moved in a direction and distance corresponding to the actual detected movement of the rightmost user's finger during the input operation. In other words, the controller 1 controls the interface such that the initially displayed character string selection range is altered by moving the endpoint cursor at a speed that is substantially the same as the actual detected movement speed of the user's rightmost finger during the input operation, thereby resulting in a travel distance of the endpoint cursor that is substantially the same as the travel distance of the user's rightmost finger during the input operation.

Figure 9:
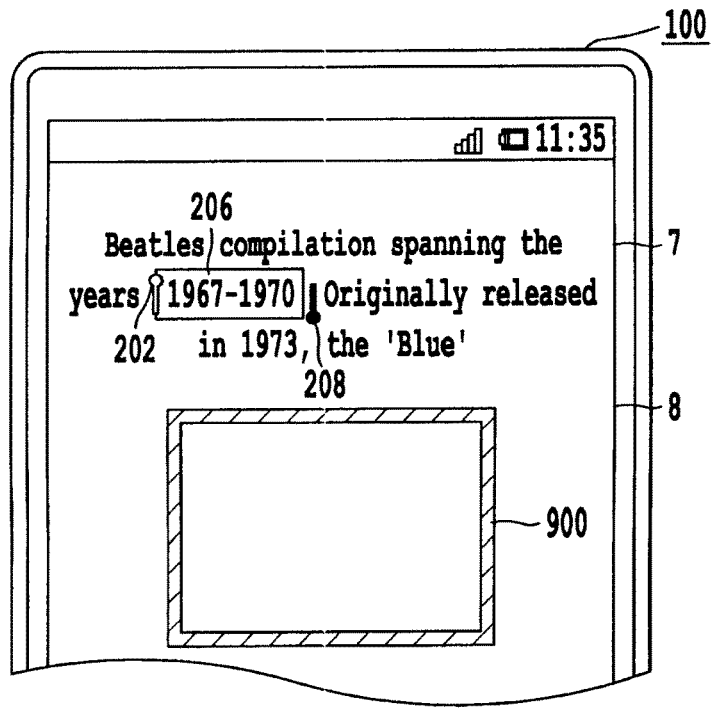
FIG. 9 illustrates an exemplary interface including an operation area for altering a character string selection range according to one aspect of the present disclosure.

Next, FIG. 9 illustrates a non-limiting example in which a displayed interface includes an operation area for performing input operations to alter a displayed character string selection range. FIG. 9 illustrates an operation area 900 displayed on the interface shown in the display 7. In one aspect of the present disclosure, input operations such as those discussed herein may be performed in the operation area 900, and in response to detecting the input operations the controller 1 may control the interface such that the initially displayed character string selection range is altered by moving the starting and/or endpoint cursors at a distance/speed that is different than the actual detected distance/speed corresponding to the instruction object movement in the operation area 900. In other words, a user may perform coarse adjustments of an initially displayed character string selection range 206 by performing input operations within the operation area 900 that correspond to moving the starting point cursor 202 and/or the endpoint cursor 208. Conversely, input operations detected in the operation area 900 may result in the cursor(s) moving at the same speed/distance as the instruction object during the input operation.

Further, rather than performing coarse adjustments of an initially displayed character string selection range when input operations are detected to be performed within the operation area 900, aspects of the present disclosure may be adapted such that fine adjustment of the initially displayed character string selection range 206 are performed (i.e., the movement speed of the starting point cursor 202 and/or the endpoint cursor 208 is slower than the actual detected moving speed of the user's finger during the input operation performed within the operation area 900).

It should be appreciated that while the non-limiting example of FIG. 9 illustrates the operation area 900 as a framed rectangular box with a shaded outer edge, other aspects of the present disclosure may incorporate alternate features when displaying an operation area, such as different colors, shapes, line sizes, etc. Additionally, the operation area 900 may be displayed on the display 7 by varying illumination intensity with respect to a remaining portion of the displayed interface, or the operation area 900 may be made to blink when it is displayed. Moreover, rather than visually designating displayed boundaries for the operation area, a portion of the touch panel operation surface without visible boundaries may be designated to perform the features described above for the operation surface 900.

Figure 10:
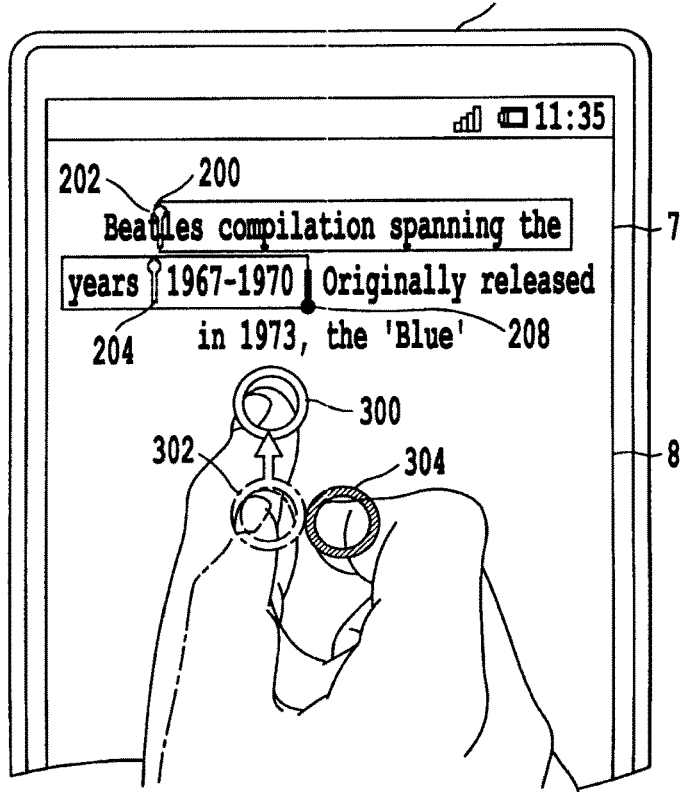
FIG. 10 illustrates another non-limiting example of altering a character string selection range according to one aspect of the present disclosure.

Next, FIG. 10 illustrates a non-limiting example of altering a displayed character string selection range by changing a line on which a cursor is displayed, based on a detected input operation analyzed according to aspects of the present disclosure. In an example of FIG. 10, the initially displayed character string selection range corresponds to the character string between the position 204 and the endpoint cursor 208 (i.e., "1967-1970"). A user performs an input operation in the example of FIG. 10 by initially contacting the operation surface of the touch panel 8 with his or her thumb and forefinger at contact points 302 and 304, respectively. While maintaining contact with the operation surface with both fingers, the user's thumb is moved from the contact point 302 to the contact point 300. In this way, a user may control the line in a displayed character string at which the starting point cursor 202 is displayed by moving his or her thumb vertically upwards or downwards. The example of FIG. 10 illustrates the starting point cursor 202 moving from its initial position corresponding to the position 204 to a final position 200 in response to a detected movement of the user's thumb from the contact point 302 to the contact point 300.

A skilled artisan will easily appreciate that similar control aspects may be performed with respect to the endpoint cursor 208, for example, by performing similar input operations using motion of the user's forefinger upwards or downwards with respect to the contact point 304. Additionally, while FIG. 10 shows an example in which movement of the starting point cursor 202 is assigned to the user's thumb and movement of the endpoint cursor 208 is assigned to the user's forefinger, it should be appreciated that aspects of the present disclosure may be applied such that, e.g., one finger corresponding to an uppermost finger in a group of fingers contacting the touch panel 8 is assigned the movement of one cursor (e.g., the starting point cursor 202), while the bottommost finger in the group of fingers is assigned the movement of another cursor (e.g., the endpoint cursor 208).

Figure 11:
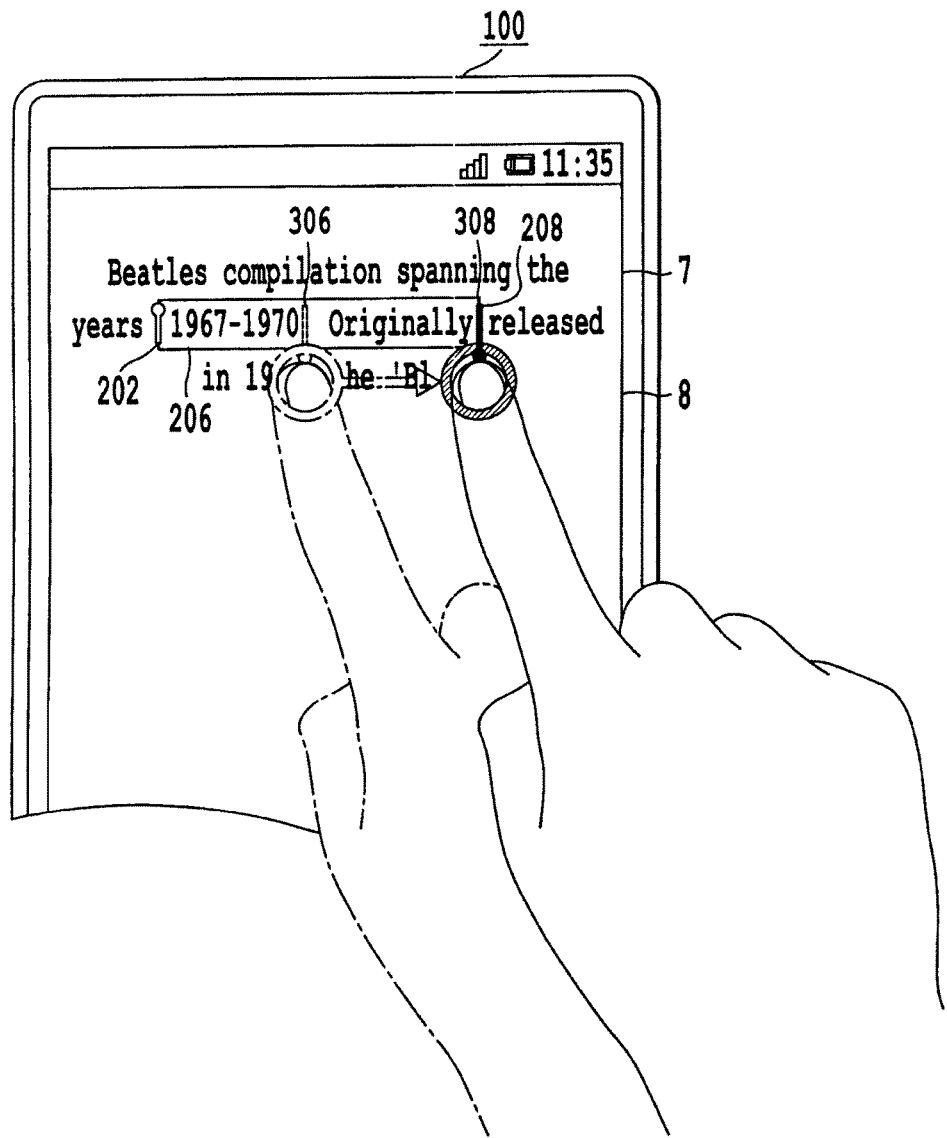
FIG. 11 illustrates another non-limiting example of altering a character string selection range using a single instruction object, according to one aspect of the present disclosure.

Next, FIG. 11 illustrates a non-limiting example of altering an initially displayed character string selection range using a single instruction object to perform an input operation. The example of FIG. 11 assumes that the initially displayed character string selection range corresponds to the character string between the starting point cursor 202 and the position 306 (i.e., "1967-1970"). In this example, the user contacts the operation surface of the touch panel 8 at a coordinate corresponding to the endpoint cursor 208, which is initially displayed at the position 306. While maintaining contact with the operation surface with the user's finger, the finger is moved from the position 306 to a final display coordinate corresponding to the position 308. In response to the detected motion of the user's finger, the controller 1 controls the interface such that the initially displayed character string selection range 206 is altered by moving the endpoint cursor 208 to the right at a movement speed corresponding to the actual movement speed of the user's finger. While this example assumes that the endpoint cursor is moved at a speed corresponding to the actual speed at which the user's finger is moved, aspects of the present disclosure may be adapted such that the movement speed of the cursors when altering an initially displayed character string selection range is different than the actual movement speed of the instruction object during the input operation. For example, the movement speed/distance of the starting point and/or endpoint cursors may be varied based on an initial coordinate detected when initially performing the input operation. For example, the movement speed/distance of the cursors may be varied when the initial coordinate of the input operation is performed at a predetermined distance away from the initially displayed character string selection range 206.

Next, FIG. 12 illustrates a non-limiting example of an algorithmic flowchart for altering a displayed character string selection range based on a touch operation performed with a single instruction object. First, the display controller 14 at step S1200 determines whether a number of instruction objects (i.e., fingers) contacting the operation surface of the touch panel 8 is equal to one. If so, the controller 1 at step S1202 determines whether an initial character string selection range is displayed on the display 7. That is, the controller 1 determines whether an input operation corresponding to the display of, for example, character string selection range 206 has been performed such that an initial character string selection range is displayed.

If the controller 1 determines at step S1202 that an initial character string selection range has been selected, the display controller 14 at step S1204 determines whether the finger contacting the point on the operation surface of the touch panel 8 has moved. As a non-limiting example of determining whether the finger has moved while touching the operation surface of the touch panel 8, the touch panel driver included in the touch panel 8, in conjunction with the display controller 14, may detect temporal changes in sensor outputs of the touch panel 8 caused by positional changes of the user's finger on the operation surface of the touch panel 8.

If movement of the user's finger is detected at step S1204, the display controller 14 determines at step S1206 whether the contact point of the user's finger on the operation surface of the touch panel 8 corresponds to a display coordinate of the starting point cursor 202. If the user's finger is determined to be contacting a corresponding position of the operation surface as a displayed coordinate of the starting point cursor 202, the controller 1 at step S1208 controls the displayed interface such that the starting point cursor is moved in a direction and a distance corresponding to the movement of the user's finger during the input operation. That is, the controller 1 controls the interface such that the initially displayed character string selection range is altered by moving the starting point cursor in substantially the same direction at substantially the same speed as the detected movement of the user's finger contacting the operation surface of the touch panel 8 during the input operation.

If it is determined at step S1206 that the user's finger is not contacting a position on the operation surface of the touch panel 8 corresponding to the displayed location of the starting point cursor 202, the display controller 14 at step S1210 determines whether the user's finger is contacting a position on the operation surface corresponding to a displayed location of the endpoint cursor 208. If it is determined that the user's finger is contacting the displayed position of the endpoint cursor 208, the controller 1 at step S1212 controls the interface such that the endpoint cursor 208 is moved in a direction and at a distance corresponding to the movement of the user's finger contacting the operation surface of the touch panel 8 during the input operation. That is, the controller 1 controls the displayed interface such that the initially displayed character string selection range is changed by moving the endpoint cursor 208 in substantially the same direction at substantially the same speed as the detected movement of the user's finger during the input operation.

As mentioned previously, the skilled artisan will easily appreciate that aspects of the present disclosure may be adapted such that the starting point and/or the endpoint cursors are moved at speeds, directions, accelerations, distances, etc. that are different than those corresponding to the movement of the detected finger in contact with the operation surface during the input operation. For example, processing such as that described with respect to FIG. 4B may be performed such that the speed, distance, etc. of the displayed movement of the starting point and/or endpoint cursors during an input operation is varied based on the initial coordinate at which the touch operation is taking place. Further, aspects described above with respect to FIG. 9 may be adapted such that input operations with a single instruction object are performed.

Figure 13A:
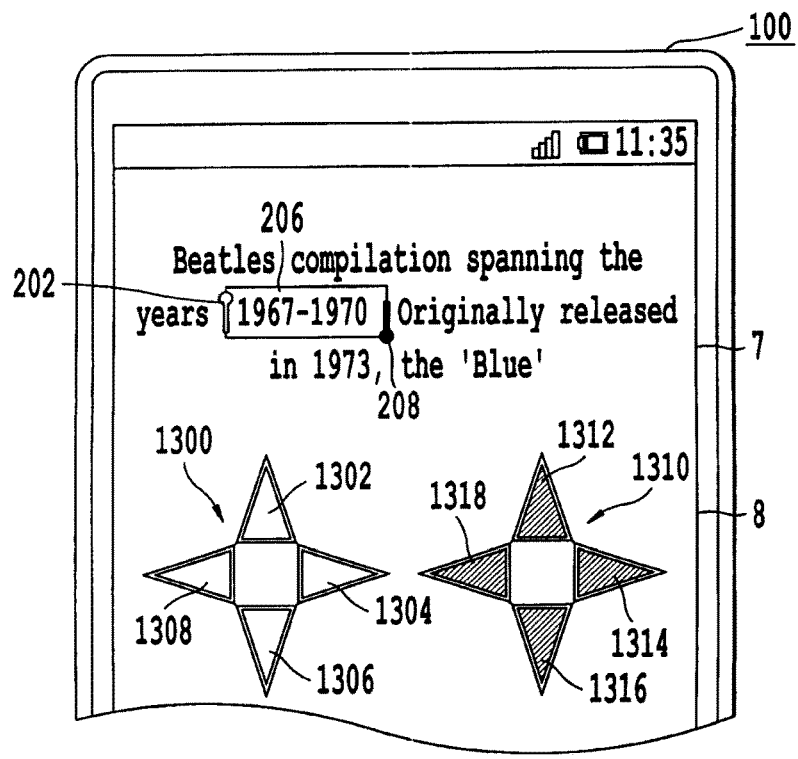
FIGS. 13A and 13B illustrate a non-limiting example of including directional keys in an interface for altering a character string selection range according to one aspect of the present disclosure.
Figure 13B:
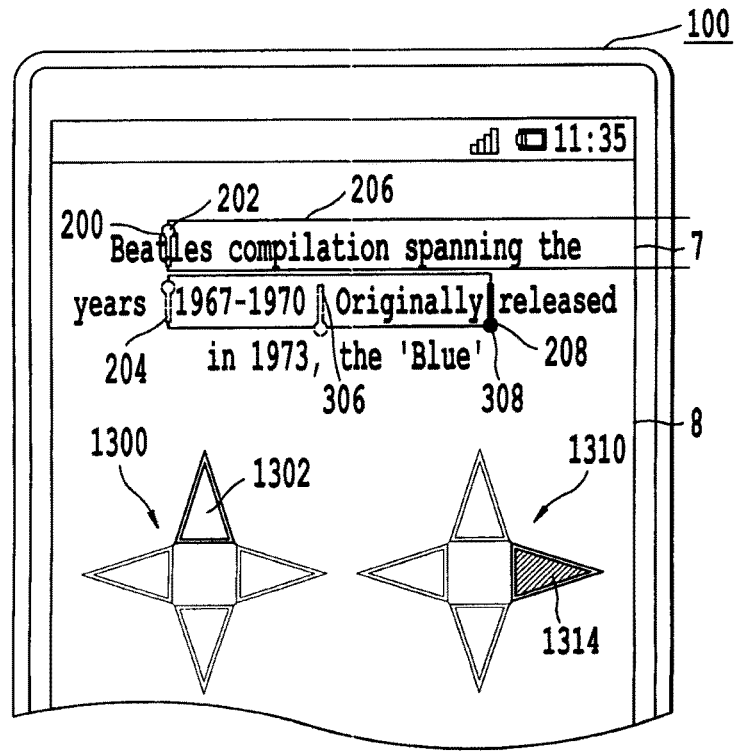

Next, FIGS. 13A and 13B illustrate non-limiting examples of including directional keys in a user interface for alternating a character string selection range. Referring first to FIG. 13A, FIG. 13A illustrates an example in which directional keys 1300 and directional keys 1310 are displayed on the interface in a location on the display 7 that is away from a displayed character string. In one aspect of the present disclosure, the directional keys 1300 and 1310 may be displayed in response to an input operation selecting a portion of a character string and/or an image for display as an initial character string selection range, such as the character string selection range 206 shown in FIG. 13A. For example, the initial character string selection range 206 may be displayed in conjunction with the directional keys 1300 and 1310 in response to a double tap operation performed on the operation surface of the touch panel 8 at a display coordinate corresponding to the character string "1967-1970".

In the example of FIG. 13A, the directional keys 1300 and 1310 each respectively include up keys 1302 and 1312, right keys 1304 and 1314, down keys 1306 and 1316, and left keys 1308 and 1318. In one aspect of the present disclosure, the controller 1 may control the interface such that one or more of the starting point cursor 202 and the endpoint cursor 208 are moved in response to an input operation performed on the operational surface of the touch panel 8 at a location corresponding to one of the keys included in the directional keys 1300 and 1310. For example, the starting point cursor 202 may be moved in response to input operations detected on the directional keys 1300. Similarly, the displayed movement of the endpoint cursor 208 may be resultant from input operations detected at a position corresponding to a displayed location of the keys included in the directional keys 1310.

The movement distance of the starting point cursor 202 and/or the endpoint cursor 208 when input operations are detected on the directional keys 1300 and 1310 may be based on a time duration during which the input operation is performed. For example, when an input operation is detected to be performed at a location corresponding to one of the directional keys shown in FIG. 13A, and a time duration is determined to be less than a predetermined time threshold, the controller 1 may control the interface such that the cursors are moved by a distance corresponding to one displayed character. It is noted that the traveling distance of the displayed cursors may be assigned based on time duration relationships determined in advance. Further, units other than single display characters may be utilized for moving the cursors in response to a detected touch operation. For example, a touch operation detected at a position corresponding to one of the directional keys shown in FIG. 13A for a predetermined amount of time may correspond to moving the cursor in increments of one or more displayed words, one or more displayed lines, one more displayed paragraphs, etc.

In another aspect of the present disclosure, the controller 1 may control the interface such that the movement speed of the cursors during an input operation corresponds to the detected time duration elapsed during the touch operation. For example, the movement speed of the cursors during the input operation may increase with increasing elapsed time duration of the touch operation.

In another aspect of the present disclosure, the increment at which the cursor moves during the input operation may change based on the detected time duration of the input operation. For example, when the input operation is determined to occur during a time duration that exceeds a predetermined time threshold range, the controller 1 may control the interface such that the cursor is moved in increments of single displayed words, or other increments and/or speeds.

Referring now to FIG. 13B, FIG. 13B illustrates a non-limiting example of altering a displayed initial character string selection range based on touch operations performed at a location on the operation surface of the touch panel 8 corresponding to the directional keys 1300 and 1310. The example of FIG. 13B assumes that the initially displayed character string selection range corresponds to the character string bounded by the position 204 and the position 306 (i.e., "1967-1970"). In response to detecting a touch operation performed at a position corresponding to the displayed coordinates of the up key 1302, the controller 1 may control the interface such that the starting point cursor 202 is moved upwards from the position 204 to a final position corresponding to the position 200. Similarly, in response to detecting a predetermined touch operation corresponding to the displayed coordinates of the right key 1314, the controller 1 may control the interface such that the endpoint cursor 208 is moved from its initial display position corresponding to the position 306 to a final position corresponding to the display position 308.

Figure 14:
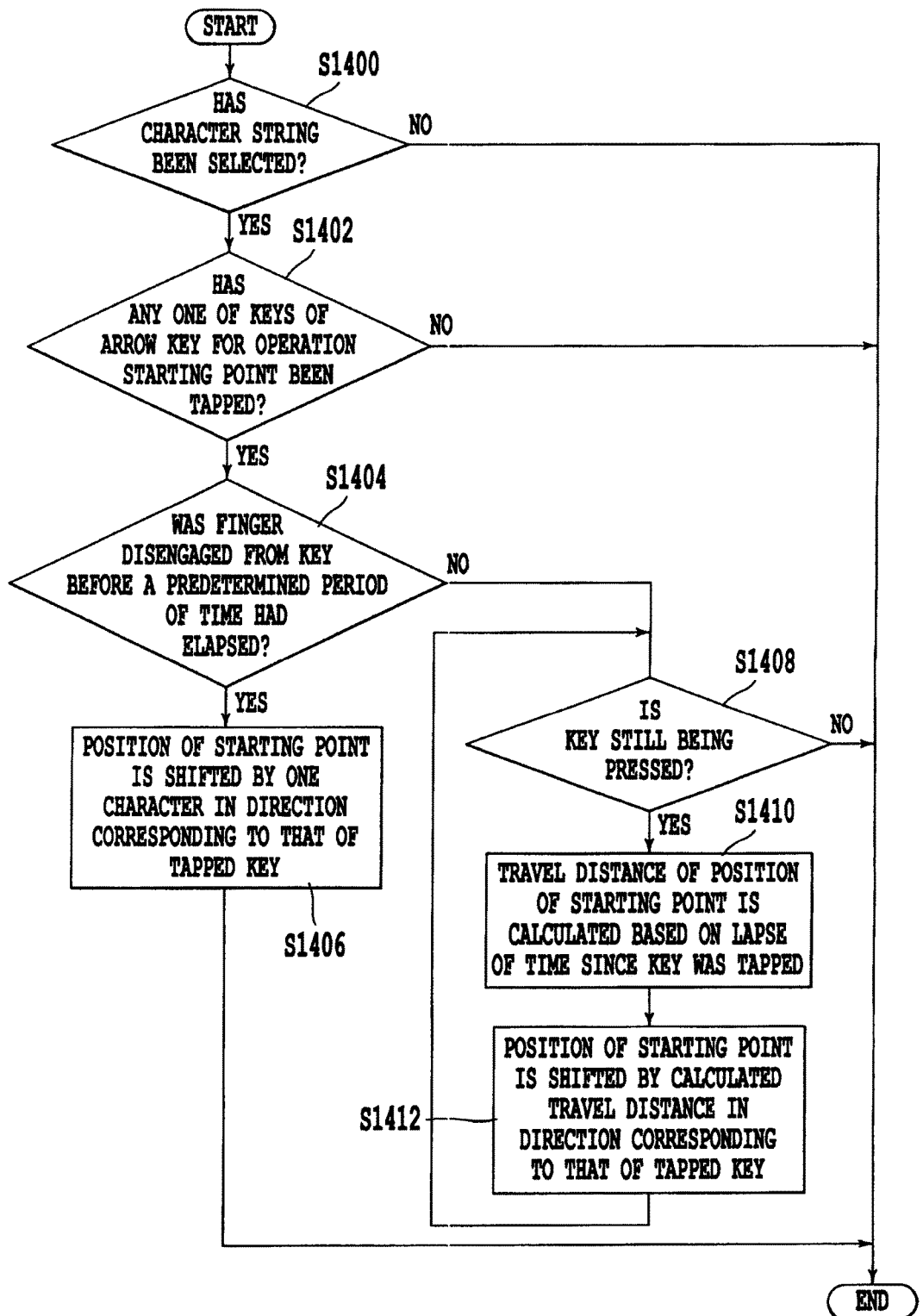
FIG. 14 illustrates an exemplary algorithmic flow chart for altering a character string selection range using an interface including directional keys, according to one aspect of the present disclosure.

Next, FIG. 14 illustrates a non-limiting example of an algorithmic flowchart for altering an initial character string selection range based on input operations using directional keys such as those described above with respect to FIGS. 13A and 13B.

First, the controller 1 at step S1400 determines whether an initial character string has been selected for display. For example, the controller 1 determines whether an input operation has been performed that results in an initial character string selection range being determined and displayed on the display 7, such as the initial character string selection range 206 shown in the example of FIG. 13A. It is noted that while the example of FIG. 14 illustrates a case in which a touch operation is performed on directional keys corresponding to the starting point cursor 202, aspects of the present disclosure may be easily adapted such that these processing features are applied to altering the initial character string selection range via movement of the endpoint cursor 208.

If an initial character string selection range has been selected and displayed, the display controller 14 at step S1402 determines whether an input operation has been performed at a position on the operational surface of the touch panel 8 corresponding to a displayed coordinate of directional keys corresponding to the starting point cursor 202 (e.g., the directional keys 1300 displayed in FIGS. 13A and 13B).

Next, at step S1404 the controller 1 and/or the display controller 14 determines whether the user's finger is disengaged from the operation surface of the touch panel 8 before a predetermined time period has elapsed. In one aspect of the present disclosure, touch operations of a duration less than the predetermined time period of step S1404 may correspond to a user performing a "tap" operation. If the controller 1 and/or the display controller 14 determines at step S1404 that the duration of the touch operation is less than the predetermined time period, the controller 1 controls the interface such that a position of the starting point cursor 202 is shifted in a direction corresponding to the touched directional key by a distance corresponding to one displayed character of the character string displayed on the display 7. In other words, the initially displayed character string selection range is expanded or contracted by a distance corresponding to one displayed character in response to the touch operation.

Otherwise, if the controller 1 and/or the display controller 14 determines at step S1404 that the touch operation duration exceeds the predetermined time period, the controller 1 at steps S1408 through S1412 controls the displayed interface such that the starting point cursor 202 is moved at a distance corresponding to the duration during which the touch operation occurs, whereby the shifting of the starting point cursor 202 continues until the controller 1 and/or the display controller 14 determines at step S1408 that the user's finger is disengaged from the operation surface of the touch panel 8. As discussed previously, the speed and/or the distance at which the starting point cursor travels during the touch operation may be varied based on the duration of the detected touch operation (e.g., the speed and/or distance of the starting point cursor 202 movement may increase with increasing duration of the touch operation).

Figure 15A:
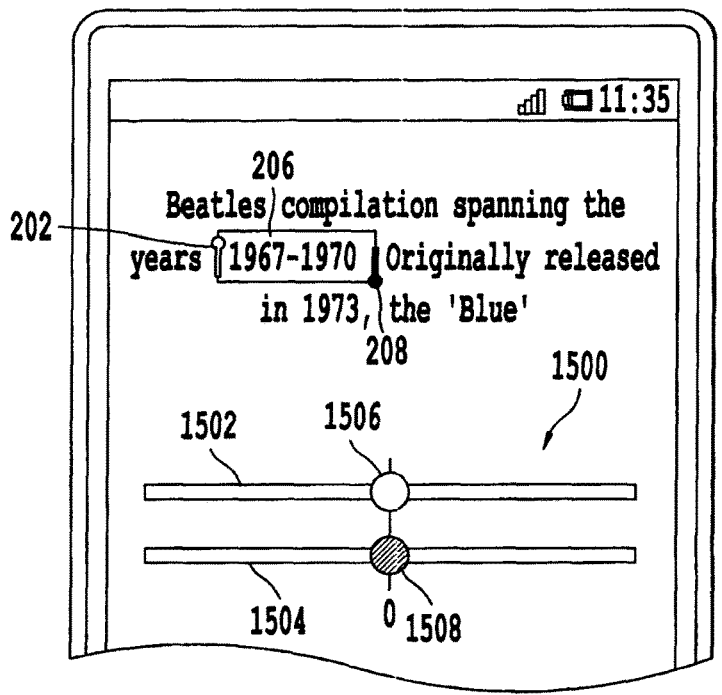
FIGS. 15A and 15B illustrate a non-limiting example of including scroll bars in an interface for altering a character string selection range according to one aspect of the present disclosure.
Figure 15B:
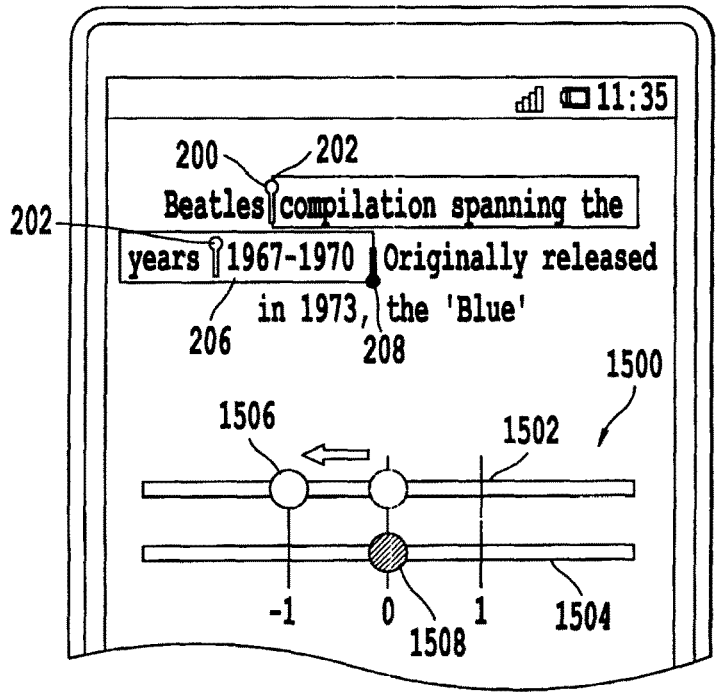

Next, FIGS. 15A and 15B illustrate non-limiting examples of scroll bars included in a displayed interface for altering an initial character string selection range. Referring first to FIG. 15A, FIG. 15A illustrates the character string of the previous examples with initially selected character string selection range 206 highlighted. The interface includes scroll bars 1500 displayed at a position that is different than the displayed position of the character string (a lower portion of the display 7 in this example). It is noted that the scroll bars 1500 may be displayed on the interface in response to a touch operation resulting in the initially displayed character string selection range 206 being selected. For example, a user may perform a touch operation at a position corresponding to the displayed position of the character string "1967-1970" that results in the character string selection range 206 being highlighted on the display and the scroll bars 1500 being displayed below the character string.

The scroll bars 1500 include a scroll bar 1502 for adjusting a position of the starting point cursor 202 via changes in position of a knob 1506. The scroll bars 1500 also include a scroll bar 1504 for altering a position of the endpoint cursor 208 via a movement in the displayed knob 1508. In the example of FIG. 15A, the initially selected character string selection range 206 may be altered based on the direction and/or the magnitude at which the knobs 1506 and 1508 are moved on their respective scroll bars relative to the center "0" position. For example, the starting point cursor 202 may be moved leftward when the knob 1506 is moved in response to a user "dragging" the knob 1506 to the left of the center position on the scroll bar 1502 during a touch operation.

In one aspect of the present disclosure, the speed and/or the distance of movement of the starting point cursor 202 and the endpoint cursor 208 may increase with increasing distance of the knobs 1506 and 1508 from their respective center positions.

Referring now to FIG. 15B, FIG. 15B illustrates a non-limiting example of altering the initially displayed character string selection range 206 of FIG. 15A in response to touch operations corresponding to the scroll bars 1502 and 1504. In the example of FIG. 15B, a touch operation is assumed to be performed at an initial coordinate corresponding to the display coordinate of the knob 1506 from FIG. 15A. While maintaining contact with the operation surface of the touch panel 8, the user may slidingly move the displayed location of the knob 1506 on the scroll bar 1502 by moving the contact point with the operation surface leftward to a new position on the scroll bar 1502, as illustrated in the movement of the knob 1506 to the "−1" position in FIG. 15B. In response to the exemplary movement illustrated in FIG. 15B, the starting point cursor 202 moves from its initial position corresponding to the position 204 to a final position corresponding to the position 200, thereby increasing the overall range of the character string selection range 206.

In one aspect of the present disclosure, the knob 1506 may return to its initial centered position on the scroll bar 1502 while the altered character string selection range 206 remains highlighted/selected on the display. The character string selection range 206 shown in FIG. 15B may then be further altered by the above methods via movements of the knobs 1506 and 1508 on their respective scroll bars.

It is noted that while the foregoing example illustrates a case in which the starting point cursor 202 is moved when altering the initially displayed character string selection range, a skilled artisan will easily appreciate that these features may easily be adapted such that the initially displayed character string selection range is altered via a movement of the endpoint cursor 208. Moreover, the present disclosure is not limited by displaying knobs at a default position corresponding to a center location on the scroll bars 1502 and 1504. For example, rather than performing coarse and fine adjustments of the position of the respective cursors based on distance from the center position of the scroll bars 1502 and 1504, the foregoing methods may be adapted such that the displayed positions of the cursors are vertically aligned with the displayed positions of the knobs 1506 and 1508. In this case, the knobs 1506 and 1508 may be displayed such that they remain vertically aligned with their respective cursors following alteration of the initially displayed character string selection range.

Figure 16:
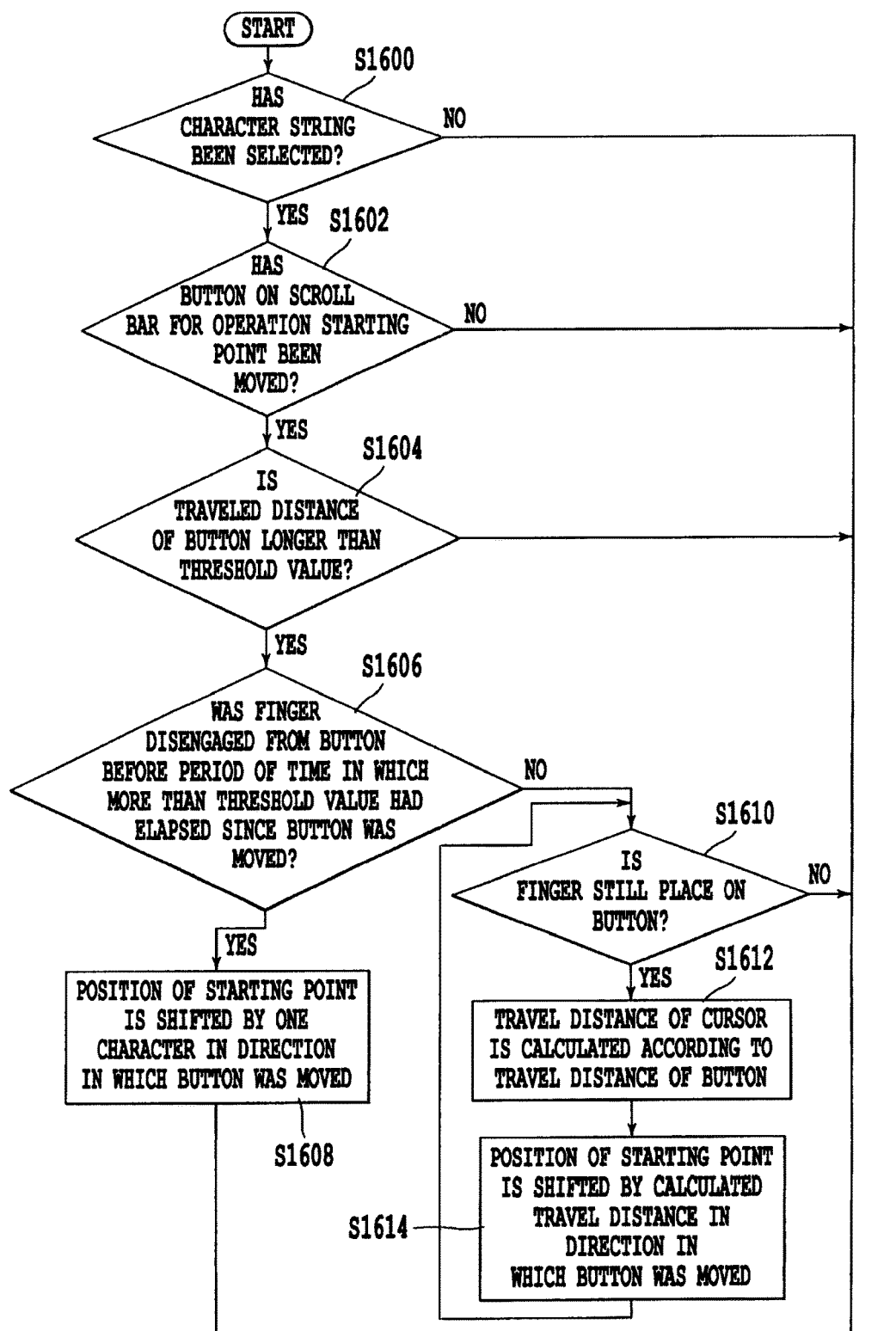
FIG. 16 illustrates an exemplary algorithmic flow chart for altering a character string selection range using an interface including scroll bars, according to one aspect of the present disclosure.

Next, FIG. 16 illustrates a non-limiting example of an algorithmic flowchart for altering an initial character string selection range based on input operations corresponding to displayed positions of scroll bars included in an interface, such as those discussed above with respect to FIGS. 15A and 15B.

First, the controller 1 at step S1600 determines whether an initial character string selection range has been selected for display on the display 7. For example, the controller 1 determines if an input operation corresponding to the initial selection of a portion of a character string displayed on the display is performed, such as the character string 206 shown initially displayed in the example of FIG. 15A.

If an initial character string selection range is selected and displayed, the display controller 14 determines at step S1602 whether a touch operation corresponding to a position of a knob/button on a scroll bar included in the interface has been performed whereby the displayed knob/button on the scroll bar is moved. It is noted that while the processing of step S1602 is described in this example for altering the position of a starting point cursor when altering the initially displayed character string selection range, aspects of the present disclosure may easily be adapted such that the features are applied to moving the endpoint cursor 208 when altering the initially displayed character string selection range.

Next, at step S1604 the display controller 14 and/or the controller 1 determine whether the moving distance of the knob/button on the scroll bar for controlling the movement of the starting point cursor 202 has exceeded a predetermined threshold value. The predetermined threshold value may, for example, correspond to a distance from the center point (or another point) of the scroll bar.

If it is determined at step S1604 that the knob/button on the scroll bar has traveled greater than the predetermined threshold distance, the display controller 14 and/or the controller 1 determines at step S1606 whether the user's finger was disengaged from the operation surface of the touch panel 8 prior to a predetermined threshold time has elapsed from the initial time that the user contacted the knob/button on the scroll bar. If it is determined at step S1606 that the predetermined time threshold was not exceeded prior to the user's finger becoming disengaged from the operation surface of the touch panel 8, the controller 1 controls the displayed interface such that the position of the starting point cursor 202 is shifted by one character in a direction corresponding to the movement of the knob/button on the scroll bar.

Otherwise, if it is determined at step S1606 that the predetermined time threshold is exceeded while performing a touch operation, the controller 1 at steps 1610 through 1614 alters the displayed position of the starting point cursor 202 in a direction and a distance corresponding to the direction and distance at which the knob/button is moved on the scroll bar. In this case, the movement of the starting point cursor 202 continues until the controller 1 determines at step S1610 that the user's finger has become disengaged from the operation surface of the touch panel 8.

Figure 17:
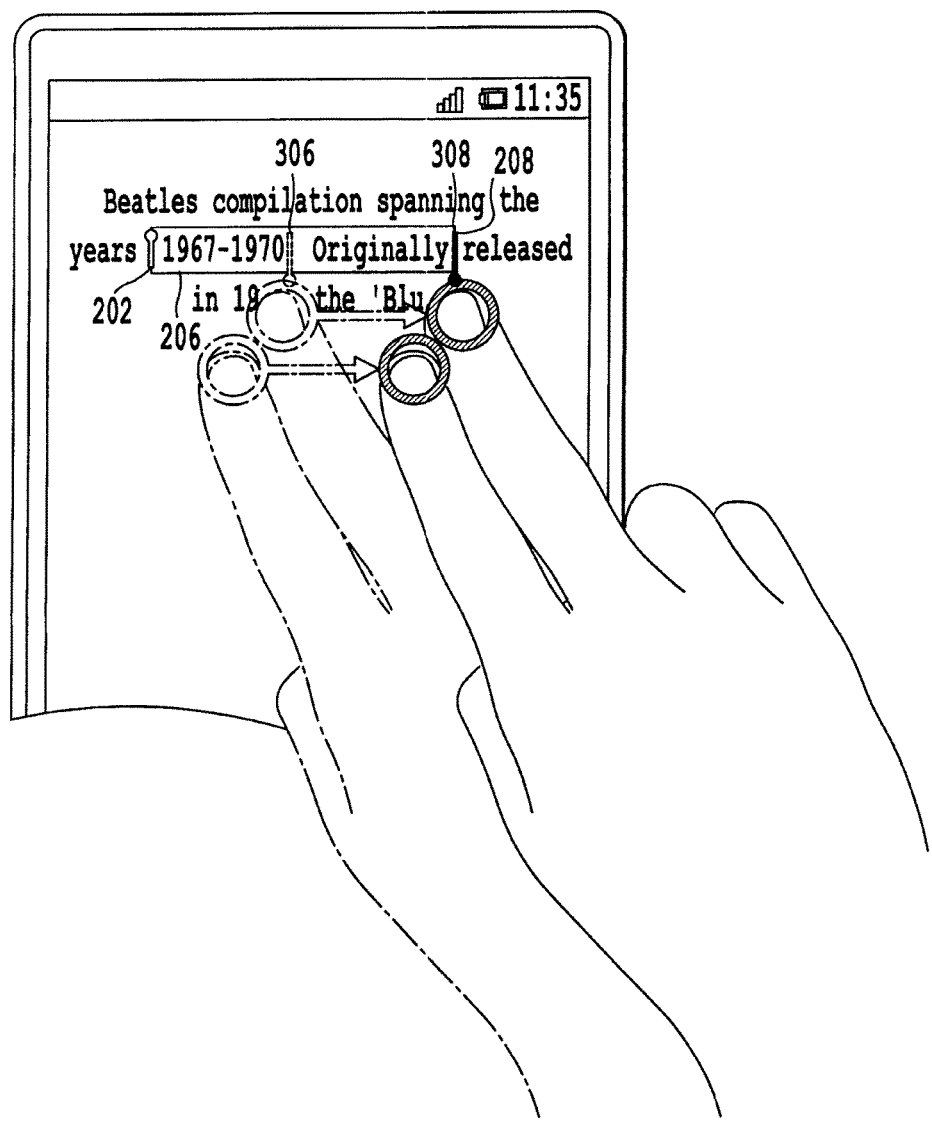
FIG. 17 illustrates a non-limiting example of altering a character string selection range based on a number of instruction objects determined to move in a corresponding direction during an input operation, according to one aspect of the present disclosure.

Next, FIG. 17 illustrates a non-limiting example of altering an initial character string selection range based on a detection of a plurality of instruction objects moving in a corresponding direction during a touch operation performed on an operation surface of the touch panel 8. The example of FIG. 17 illustrates a user contracting the operation surface of the touch panel 8 with two fingers and performing an input operation of maintaining contact with the operation surface while moving both fingers concurrently in a substantially same direction. FIG. 17 assumes that the initial contact coordinate of the user's fingers corresponds to the displayed position of the initial location of the endpoint cursor 208 (i.e., position 306).

In one aspect of the present disclosure, the controller 1 may control the interface such that the speed/distance at which the endpoint cursor 208 is moved is dependent upon the number of instruction objects (e.g., fingers) detected moving in a corresponding direction. For example, as in the case of the example of FIG. 17, the controller 1 may control the interface such that the endpoint cursor 208 is moved at a speed that is different than the actual movement speed of the user's fingers when two or more fingers are determined to be in contact with the operation surface of the touch panel 8 and moving in a corresponding direction during the input operation. Conversely, the movement speed of the endpoint cursor 208 may be the same as the actual movement speed of the user's fingers when the controller 1 and/or the display controller 14 determines that two or more instruction objects are in contact with the operation surface of the touch panel 8 and moving in a corresponding direction during the input operation. In this way, the initially displayed character string selection range may be adjusted finely or coarsely based on the number of instruction objects moving in a corresponding direction during the input operation.

It is noted that while the example of FIG. 17 illustrates an input operation using two fingers moving in a corresponding direction, this is not limiting and aspects of the present disclosure may be easily adapted such that the initially displayed character string selection range is altered based on a detection of more or less than two instruction objects moving in a corresponding direction during the input operation. In one aspect of the present disclosure, the speed and/or distance at which the starting point and/or endpoint cursors are moved when altering the initially displayed character string selection range may be varied directly or indirectly proportionately to the number of fingers detected moving in a corresponding direction during the input operation.

It should be appreciated that while the foregoing examples generally relate to adjusting an initially displayed character string selection range (i.e., selected text), a skilled artisan may easily adapt aspects of the present disclosure such that other displayed elements (e.g., images) of an interface are altered based on methods described herein. Further, it is not necessary that a starting point and/or endpoint cursor be displayed as part of a character string selection range. Additionally, the present disclosure is not limited to use of a particular type of touch panel technology, and aspects of the present disclosure may be applied to any touch panel capable of detecting multiple concurrent touch operations such as an ultrasonic surface acoustic wave system, an infrared ray scan mode system, a resistive film type system, or an electrostatic capacitive type system. Moreover, the mobile device 100 is not limited to a particular device type. Accordingly, aspects of the present disclosure may be adapted such that they are performed using a smartphone, a tablet terminal, a game terminal, a portable navigation unit, a touch screen monitor, a laptop computer, or the like.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) An apparatus including: a touch panel display that displays an interface including at least one of one or more character strings and one or more images, the touch panel display including one or more sensors for detecting an input operation by one or more instruction objects on the touch panel display; and circuitry configured to: control the touch panel display such that an initial selection range of the at least one of the one or more character strings and the one or more images is displayed; determine an initial coordinate corresponding to a position on an operation surface of the touch panel display at which the input operation is initially performed; determine a speed at which the instruction object moves on the operation surface during the input operation; and selectively determine, based on a predetermined condition of the input operation, a first mode and a second mode of altering the displayed initial selection range, wherein the initial selection range includes a starting point and an end point that are displayed on the touch panel display, the circuitry alters the initial selection range by controlling the touch panel display such that, in response to the detection of the input operation and based on the selectively determined mode, at least one of the displayed starting point and the displayed end point are moved at a predetermined speed from their initial positions, when the circuitry determines the initial selection range is altered in accordance with the first mode, the circuitry controls the touch panel display such that the predetermined speed is different than the detected speed at which the instruction object moves on the operation surface, and when the circuitry determines the initial selection range is altered in accordance with the second mode, the circuitry controls the touch panel display such that the predetermined speed is substantially the same as the detected speed at which the instruction object moves on the operation surface.

(2) The apparatus of (1), wherein the predetermined condition is based on the determined initial coordinate.

(3) The apparatus of (1) or (2), wherein the first mode is selected when the initial coordinate is at least a predetermined distance from a display coordinate included in one of the initial selection range, the one or more character strings, and the one or more images.

(4) The apparatus of any one of (1) to (3), wherein the second mode is selected when the initial coordinate is within the predetermined distance from the display coordinate.

(5) The apparatus of any one of (1) to (4), wherein: when the first mode is selected, the circuitry controls the touch panel display such that an operation area is displayed on the touch panel display, and when the input operation is performed within the operation area, the circuitry is configured to alter the displayed initial selection range by moving the at least one of the displayed starting point and the displayed end point at the predetermined speed that is different than the detected speed.

(6) The apparatus of any one of (1) to (5), wherein the circuitry is configured to calculate a time duration during which at least one of the one or more instruction objects are in contact with the operation surface during the input operation.

(7) The apparatus of any one of (1) to (6), wherein a travel distance of the at least one of the displayed starting point and the displayed end point during the altering of the initial selection range is based on the calculated time duration.

(8) The apparatus of any one of (1) to (7), wherein the predetermined condition is based on a number of instruction objects detected during the input operation.

(9) The apparatus of any one of (1) to (8), wherein the second mode is selected when two or more instruction objects are detected during the input operation.

(10) The apparatus of any one of (1) to (9), wherein the second mode is selected when the two or more instruction objects are detected moving in a corresponding direction.

(11) The apparatus of any one of (1) to (10), wherein the second mode is selected when the two or more instruction objects that are moving in the corresponding direction are the only instruction objects detected on the operation surface.

(12) The apparatus of any one of (1) to (11), wherein when two instruction objects are detected on the operation surface of the touch panel display during the input operation, the initial detection range is altered by moving the starting point in a direction corresponding to a movement of the left-most detected instruction object and by moving the end point in a direction corresponding to a movement of the right-most detected instruction object.

(13) The apparatus of any one of (1) to (12), wherein: the interface includes one or more directional keys, and when the input operation is performed at a position on the operation surface corresponding to the one or more directional keys, the circuitry alters the initial selection range based on a predetermined movement direction assigned to the one or more directional keys.

(14) The apparatus of any one of (1) to (13), wherein when the input operation corresponds to tapping the instruction object on the operation surface for less than or equal to a predetermined time period at the position corresponding to the one or more directional keys, the circuitry alters the initial selection range by moving one of the start point and the end point a distance corresponding to one character, of the characters included in the one or more character strings.

(15) The apparatus of any one of (1) to (14), wherein: a first set of directional keys corresponds to the starting point such that a detected input operation performed at a position corresponding to the first set of directional keys results in the circuitry controlling the touch panel display to alter the initial selection range by moving the starting point, and a second set of directional keys corresponds to the end point such that a detected input operation performed at a position corresponding to the second set of directional keys results in the circuitry controlling the touch panel display to alter the initial selection range by moving the end point.

(16) The apparatus of any one of (1) to (15), wherein: the interface includes one or more scroll bars including one or more markers corresponding to the starting point and the end point, and when the input operation is performed at a position on the operation surface corresponding to the one or more markers, the circuitry controls the touch panel display such that a displayed position of the one or more markers changes based on positional changes of the one or more instruction objects while the one or more instruction objects are maintained in contact with the operations surface.

(17) The apparatus of any one of (1) to (16), wherein: the circuitry controls the touch panel display such that the displayed initial selection range is changed by moving one or more of the starting point and the end point in a direction corresponding to the changing of the displayed position of the one or more markers, and the predetermined speed at which the one or more of the starting point and the end point are moved increases with increasing distance of the one or more markers from a center region of the one or more scroll bars.

(18) The apparatus of any one of (1) to (17), wherein: the predetermined condition is based on a comparison of the determined speed at which the instruction object moves on the operation surface during the input operation, the first mode is selected when the determined speed is greater than a predetermined speed threshold, and the second mode is selected when the determined speed is less than the predetermined threshold.

(19) A method of controlling a touch panel display that displays an interface including at least one of one or more character strings and one or more images, the touch panel display including one or more sensors for detecting an input operation by one or more instruction objects on the touch panel display, the method including: controlling, by circuitry, the touch panel display such that an initial selection range of the at least one of the one or more character strings and the one or more images is displayed; determining, by the circuitry, an initial coordinate corresponding to a position on an operation surface of the touch panel display at which the input operation is initially performed; determining, by the circuitry, a speed at which the instruction object moves on the operation surface during the input operation; and selectively determining, by the circuitry based on a predetermined condition of the input operation, a first mode and a second mode of altering the initial selection range, wherein the initial selection range includes a starting point and an end point that are displayed on the touch panel display, the circuitry alters the initial selection range by controlling the touch panel display such that, in response to the detection of the input operation and based on the selectively determined mode, at least one of the displayed starting point and the displayed end point are moved at a predetermined speed from their initial positions, when the circuitry determines the initial selection range is altered in accordance with the first mode, the circuitry controls the touch panel display such that the predetermined speed is different than the detected speed at which the instruction object moves on the operation surface, and when the circuitry determines the initial selection range is altered in accordance with the second mode, the circuitry controls the touch panel display such that the predetermined speed is substantially the same as the detected speed at which the instruction object moves on the operation surface.

(20) A non-transitory computer readable medium having instructions stored therein that when executed by one or more processors causes the one or more processors to perform a method including: displaying an interface including at least one of one or more character strings and one or more images on a touch panel display; detecting, based on an input from one or more sensors included in the touch panel display, an input operation by one or more instruction objects on the touch panel display; controlling the touch panel display such that an initial selection range of the at least one of the one or more character strings and the one or more images is displayed; determining an initial coordinate corresponding to a position on an operation surface of the touch panel display at which the input operation is initially performed; determining a speed at which the instruction object moves on the operation surface during the input operation; and selectively determining, based on a predetermined condition of the input operation, a first mode and a second mode of altering the initial selection range, wherein the initial selection range includes a starting point and an end point that are displayed on the touch panel display, the initial selection range is altered by controlling the touch panel display such that, in response to the detection of the input operation and based on the selectively determined mode, at least one of the displayed starting point and the displayed end point are moved at a predetermined speed from their initial positions, when the initial selection range is altered in accordance with the first mode, the touch panel display is controlled such that the predetermined speed is different than the detected speed at which the instruction object moves on the operation surface, and when the initial selection range is altered in accordance with the second mode, the touch panel display is controlled such that the predetermined speed is substantially the same as the detected speed at which the instruction object moves on the operation surface.

The invention claimed is:

1. An apparatus comprising:
a touch panel display that displays an interface including at least one of one or more character strings and one or more images, the touch panel display including one or more sensors for detecting an input operation by one or more instruction objects on the touch panel display; and
circuitry configured to:
control the touch panel display such that an initial selection range of the at least one of the one or more character strings and the one or more images is displayed;
determine an initial coordinate corresponding to a position on an operation surface of the touch panel display at which the input operation is initially performed;
determine a speed at which the instruction object moves on the operation surface during the input operation; and
selectively determine, based on a predetermined condition of the input operation, a first mode and a second mode of altering the displayed initial selection range, wherein
the initial selection range includes a starting point and an end point that are displayed on the touch panel display,
the circuitry alters the initial selection range by controlling the touch panel display such that, in response to the detection of the input operation and based on the selectively determined mode, at least one of the displayed starting point and the displayed end point are moved at a predetermined speed from their initial positions,
when the circuitry determines the initial selection range is altered in accordance with the first mode, the circuitry controls the touch panel display such that the predetermined speed is different than the detected speed at which the instruction object moves on the operation surface, and
when the circuitry determines the initial selection range is altered in accordance with the second mode, the circuitry controls the touch panel display such that the predetermined speed is substantially the same as the detected speed at which the instruction object moves on the operation surface.

2. The apparatus of claim 1, wherein
the predetermined condition is based on the determined initial coordinate.

3. The apparatus of claim 2, wherein
the first mode is selected when the initial coordinate is at least a predetermined distance from a display coordinate included in one of the initial selection range, the one or more character strings, and the one or more images.

4. The apparatus of claim 3, wherein
the second mode is selected when the initial coordinate is within the predetermined distance from the display coordinate.

5. The apparatus of claim 3, wherein:
when the first mode is selected, the circuitry controls the touch panel display such that an operation area is displayed on the touch panel display, and
when the input operation is performed within the operation area, the circuitry is configured to alter the displayed initial selection range by moving the at least one of the displayed starting point and the displayed end point at the predetermined speed that is different than the detected speed.

6. The apparatus of claim 1, wherein
the circuitry is configured to calculate a time duration during which at least one of the one or more instruction objects are in contact with the operation surface during the input operation.

7. The apparatus of claim 6, wherein
a travel distance of the at least one of the displayed starting point and the displayed end point during the altering of the initial selection range is based on the calculated time duration.

8. The apparatus of claim 1, wherein
the predetermined condition is based on a number of instruction objects detected during the input operation.

9. The apparatus of claim 8, wherein
the second mode is selected when two or more instruction objects are detected during the input operation.

10. The apparatus of claim 9, wherein
the second mode is selected when the two or more instruction objects are detected moving in a corresponding direction.

11. The apparatus of claim 10, wherein
the second mode is selected when the two or more instruction objects that are moving in the corresponding direction are the only instruction objects detected on the operation surface.

12. The apparatus of claim 1, wherein
when two instruction objects are detected on the operation surface of the touch panel display during the input operation, the initial detection range is altered by moving the starting point in a direction corresponding to a movement of the left-most detected instruction object and by moving the end point in a direction corresponding to a movement of the right-most detected instruction object.

13. The apparatus of claim 1, wherein:
the interface includes one or more directional keys, and
when the input operation is performed at a position on the operation surface corresponding to the one or more directional keys, the circuitry alters the initial selection range based on a predetermined movement direction assigned to the one or more directional keys.

14. The apparatus of claim 13, wherein
when the input operation corresponds to tapping the instruction object on the operation surface for less than or equal to a predetermined time period at the position corresponding to the one or more directional keys, the circuitry alters the initial selection range by moving one of the start point and the end point a distance corresponding to one character, of the characters included in the one or more character strings.

15. The apparatus of claim 13, wherein:
a first set of directional keys corresponds to the starting point such that a detected input operation performed at a position corresponding to the first set of directional keys results in the circuitry controlling the touch panel display to alter the initial selection range by moving the starting point, and
a second set of directional keys corresponds to the end point such that a detected input operation performed at a position corresponding to the second set of directional keys results in the circuitry controlling the touch panel display to alter the initial selection range by moving the end point.

16. The apparatus of claim 1, wherein:
the interface includes one or more scroll bars including one or more markers corresponding to the starting point and the end point, and
when the input operation is performed at a position on the operation surface corresponding to the one or more markers, the circuitry controls the touch panel display such that a displayed position of the one or more markers changes based on positional changes of the one or more instruction objects while the one or more instruction objects are maintained in contact with the operations surface.

17. The apparatus of claim 16, wherein:
the circuitry controls the touch panel display such that the displayed initial selection range is changed by moving one or more of the starting point and the end point in a direction corresponding to the changing of the displayed position of the one or more markers, and
the predetermined speed at which the one or more of the starting point and the end point are moved increases with increasing distance of the one or more markers from a center region of the one or more scroll bars.

18. The apparatus of claim 1, wherein:
the predetermined condition is based on a comparison of the determined speed at which the instruction object moves on the operation surface during the input operation,
the first mode is selected when the determined speed is greater than a predetermined speed threshold, and
the second mode is selected when the determined speed is less than the predetermined threshold.

19. A method of controlling a touch panel display that displays an interface including at least one of one or more character strings and one or more images, the touch panel display including one or more sensors for detecting an input operation by one or more instruction objects on the touch panel display, the method comprising:
controlling, by circuitry, the touch panel display such that an initial selection range of the at least one of the one or more character strings and the one or more images is displayed;
determining, by the circuitry, an initial coordinate corresponding to a position on an operation surface of the touch panel display at which the input operation is initially performed;
determining, by the circuitry, a speed at which the instruction object moves on the operation surface during the input operation; and
selectively determining, by the circuitry based on a predetermined condition of the input operation, a first mode and a second mode of altering the initial selection range, wherein
the initial selection range includes a starting point and an end point that are displayed on the touch panel display,
the circuitry alters the initial selection range by controlling the touch panel display such that, in response to the detection of the input operation and based on the selectively determined mode, at least one of the displayed starting point and the displayed end point are moved at a predetermined speed from their initial positions,
when the circuitry determines the initial selection range is altered in accordance with the first mode, the circuitry controls the touch panel display such that the predetermined speed is different than the detected speed at which the instruction object moves on the operation surface, and
when the circuitry determines the initial selection range is altered in accordance with the second mode, the circuitry controls the touch panel display such that the predetermined speed is substantially the same as the detected speed at which the instruction object moves on the operation surface.

20. A non-transitory computer readable medium having instructions stored therein that when executed by one or more processors causes the one or more processors to perform a method comprising:
displaying an interface including at least one of one or more character strings and one or more images on a touch panel display;
detecting, based on an input from one or more sensors included in the touch panel display, an input operation by one or more instruction objects on the touch panel display;
controlling the touch panel display such that an initial selection range of the at least one of the one or more character strings and the one or more images is displayed;
determining an initial coordinate corresponding to a position on an operation surface of the touch panel display at which the input operation is initially performed;
determining a speed at which the instruction object moves on the operation surface during the input operation; and
selectively determining, based on a predetermined condition of the input operation, a first mode and a second mode of altering the initial selection range, wherein
the initial selection range includes a starting point and an end point that are displayed on the touch panel display,
the initial selection range is altered by controlling the touch panel display such that, in response to the detection of the input operation and based on the selectively determined mode, at least one of the displayed starting point and the displayed end point are moved at a predetermined speed from their initial positions,
when the initial selection range is altered in accordance with the first mode, the touch panel display is controlled such that the predetermined speed is different than the detected speed at which the instruction object moves on the operation surface, and
when the initial selection range is altered in accordance with the second mode, the touch panel display is controlled such that the predetermined speed is substantially the same as the detected speed at which the instruction object moves on the operation surface.

\* \* \* \* \*